US007568080B2

(12) United States Patent
Prahlad et al.

(10) Patent No.: US 7,568,080 B2
(45) Date of Patent: Jul. 28, 2009

(54) SNAPSHOT STORAGE AND MANAGEMENT SYSTEM WITH INDEXING AND USER INTERFACE

(75) Inventors: Anand Prahlad, East Brunswick, NJ (US); Andreas May, Marlboro, NJ (US); Norman R. Lunde, Middletown, NJ (US); Lixin Zhou, Marlboro, NJ (US); Avinash Kumar, Ocean, NJ (US); David Ngo, Shrewbury, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 10/681,386

(22) Filed: Oct. 7, 2003

(65) Prior Publication Data

US 2004/0250033 A1   Dec. 9, 2004

Related U.S. Application Data

(60) Provisional application No. 60/416,717, filed on Oct. 7, 2002.

(51) Int. Cl.
*G06F 13/00* (2006.01)
(52) U.S. Cl. ........................ 711/162; 707/204
(58) Field of Classification Search ............... 711/114, 711/161–162; 714/2, 5, 6, 15; 707/202, 707/204
See application file for complete search history.

(56) References Cited

U.S. PATENT DOCUMENTS

| 4,686,620 | A | 8/1987 | Ng .................... 707/10 |
| 4,995,035 | A | 2/1991 | Cole et al. ............ 370/254 |
| 5,005,122 | A | 4/1991 | Griffin et al. .......... 709/203 |
| 5,093,912 | A | 3/1992 | Dong et al. ............ 718/104 |
| 5,133,065 | A | 7/1992 | Cheffetz et al. .......... 714/2 |
| 5,193,154 | A | 3/1993 | Kitajima et al. ........ 707/204 |
| 5,212,772 | A | 5/1993 | Masters ................ 714/20 |

(Continued)

FOREIGN PATENT DOCUMENTS

EP    0 259 912    3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner*—Kevin L Ellis
*Assistant Examiner*—Jared I Rutz
(74) *Attorney, Agent, or Firm*—Perkins Coie LLP

(57) ABSTRACT

A system and method of managing stored data in a storage management system. The storage management system includes a storage manager, a media agent connected to the storage manager, and a primary volume connected to the media agent. A plurality of snapshots are taken of the primary volume. The snapshots are indexed by associating respective information with the snapshot. The indexed snapshots are copied to a recovery volume. In this way, browsing features are enabled for the user. The user may view the snapshots in a hierarchical format, and may even view snapshot data in association with the corresponding application. The resultant recovery volume may be used to replace a primary volume.

8 Claims, 12 Drawing Sheets

U.S. PATENT DOCUMENTS

| | | | |
|---|---|---|---|
| 5,226,157 A | 7/1993 | Nakano et al. | 711/162 |
| 5,239,647 A | 8/1993 | Anglin et al. | 707/205 |
| 5,241,668 A | 8/1993 | Eastridge et al. | 714/5 |
| 5,241,670 A | 8/1993 | Eastridge et al. | 714/1 |
| 5,263,154 A | 11/1993 | Eastridge et al. | |
| 5,276,860 A | 1/1994 | Fortier et al. | 714/6 |
| 5,276,867 A | 1/1994 | Kenley et al. | 707/204 |
| 5,287,500 A | 2/1994 | Stoppani, Jr. | 711/211 |
| 5,317,731 A | 5/1994 | Dias et al. | |
| 5,321,816 A | 6/1994 | Rogan et al. | 705/42 |
| 5,333,315 A | 7/1994 | Saether et al. | 707/1 |
| 5,347,653 A | 9/1994 | Flynn et al. | 707/203 |
| 5,369,757 A | 11/1994 | Spiro et al. | |
| 5,403,639 A | 4/1995 | Belsan et al. | |
| 5,410,700 A | 4/1995 | Fecteau et al. | 718/100 |
| 5,448,724 A | 9/1995 | Hayashi | 714/4 |
| 5,491,810 A | 2/1996 | Allen | 711/117 |
| 5,495,607 A | 2/1996 | Pisello et al. | 707/10 |
| 5,504,873 A | 4/1996 | Martin et al. | 711/111 |
| 5,544,345 A | 8/1996 | Carpenter et al. | 711/150 |
| 5,544,347 A | 8/1996 | Yanai et al. | 711/162 |
| 5,559,957 A | 9/1996 | Balk | 714/23 |
| 5,604,862 A * | 2/1997 | Midgely et al. | 714/6 |
| 5,619,644 A | 4/1997 | Crockett et al. | 714/45 |
| 5,638,509 A | 6/1997 | Dunphy et al. | 714/20 |
| 5,673,381 A | 9/1997 | Huai et al. | 714/1 |
| 5,699,361 A | 12/1997 | Ding et al. | 370/431 |
| 5,720,026 A | 2/1998 | Uemura et al. | |
| 5,729,743 A | 3/1998 | Squibb | 707/203 |
| 5,751,997 A | 5/1998 | Kullick et al. | 711/162 |
| 5,758,359 A | 5/1998 | Saxon | 707/204 |
| 5,761,677 A | 6/1998 | Senator et al. | 707/203 |
| 5,764,972 A | 6/1998 | Crouse et al. | 707/1 |
| 5,765,173 A | 6/1998 | Cane et al. | |
| 5,778,395 A | 7/1998 | Whiting et al. | 707/204 |
| 5,790,114 A | 8/1998 | Geaghan et al. | |
| 5,812,398 A | 9/1998 | Nielsen | 705/1 |
| 5,813,009 A | 9/1998 | Johnson et al. | 707/100 |
| 5,813,017 A | 9/1998 | Morris | 707/204 |
| 5,875,478 A | 2/1999 | Blumenau | 711/162 |
| 5,878,408 A | 3/1999 | Van Huben et al. | |
| 5,887,134 A | 3/1999 | Ebrahim | 709/200 |
| 5,901,327 A | 5/1999 | Ofek | 710/5 |
| 5,907,672 A | 5/1999 | Matze et al. | |
| 5,924,102 A | 7/1999 | Perks | 707/200 |
| 5,950,205 A | 9/1999 | Aviani, Jr. | 707/103 R |
| 5,974,563 A | 10/1999 | Beeler, Jr. | 714/5 |
| 6,021,415 A | 2/2000 | Cannon et al. | 707/206 |
| 6,021,475 A * | 2/2000 | Nguyen et al. | 711/156 |
| 6,026,414 A | 2/2000 | Anglin | 707/204 |
| 6,052,735 A | 4/2000 | Ulrich et al. | 709/236 |
| 6,072,490 A | 6/2000 | Bates et al. | |
| 6,076,148 A | 6/2000 | Kedem | 711/162 |
| 6,094,416 A | 7/2000 | Ying | 370/242 |
| 6,131,095 A | 10/2000 | Low et al. | 707/10 |
| 6,131,148 A | 10/2000 | West et al. | |
| 6,131,190 A | 10/2000 | Sidwell | 717/115 |
| 6,148,412 A | 11/2000 | Cannon et al. | 714/6 |
| 6,154,787 A | 11/2000 | Urevig et al. | 710/8 |
| 6,161,111 A | 12/2000 | Mutalik et al. | 707/205 |
| 6,167,402 A | 12/2000 | Yeager | 707/10 |
| 6,195,695 B1 | 2/2001 | Cheston et al. | 709/221 |
| 6,205,450 B1 | 3/2001 | Kanome et al. | |
| 6,212,512 B1 | 4/2001 | Barney et al. | 707/1 |
| 6,260,069 B1 | 7/2001 | Anglin | 709/229 |
| 6,269,431 B1 | 7/2001 | Dunham | 711/162 |
| 6,275,953 B1 | 8/2001 | Vahalia et al. | 714/11 |
| 6,301,592 B1 | 10/2001 | Aoyama et al. | 715/511 |
| 6,311,193 B1 * | 10/2001 | Sekido | 707/202 |
| 6,324,581 B1 | 11/2001 | Xu et al. | 709/229 |
| 6,328,766 B1 | 12/2001 | Long | 710/8 |
| 6,330,570 B1 | 12/2001 | Crighton | 707/204 |
| 6,330,642 B1 | 12/2001 | Carteau | 711/114 |
| 6,343,324 B1 | 1/2002 | Hubis et al. | 709/229 |
| RE37,601 E | 3/2002 | Eastridge et al. | 714/6 |
| 6,356,801 B1 | 3/2002 | Goodman et al. | 700/214 |
| 6,366,986 B1 * | 4/2002 | St. Pierre et al. | 711/162 |
| 6,366,988 B1 | 4/2002 | Skiba et al. | |
| 6,374,363 B1 | 4/2002 | Wu et al. | |
| 6,389,432 B1 | 5/2002 | Pothapragada et al. | 707/205 |
| 6,418,478 B1 | 7/2002 | Ignatius et al. | |
| 6,421,711 B1 | 7/2002 | Blumenau et al. | 709/213 |
| 6,434,681 B1 | 8/2002 | Armangau | |
| 6,473,775 B1 | 10/2002 | Kusters et al. | |
| 6,487,561 B1 | 11/2002 | Ofek et al. | 707/204 |
| 6,519,679 B2 | 2/2003 | Devireddy et al. | 711/114 |
| 6,538,669 B1 | 3/2003 | Lagueux, Jr. et al. | 715/764 |
| 6,564,228 B1 | 5/2003 | O'Connor | 707/200 |
| 6,604,118 B2 | 8/2003 | Kleiman et al. | |
| 6,631,477 B1 * | 10/2003 | LeCrone et al. | 714/5 |
| 6,647,473 B1 | 11/2003 | Golds et al. | |
| 6,651,075 B1 * | 11/2003 | Kusters et al. | 707/204 |
| 6,665,815 B1 | 12/2003 | Goldstein et al. | |
| 6,721,767 B2 * | 4/2004 | De Meno et al. | 707/204 |
| 6,732,125 B1 | 5/2004 | Autrey et al. | |
| 6,792,518 B2 * | 9/2004 | Armangau et al. | 711/162 |
| 6,799,258 B1 | 9/2004 | Linde | |
| 6,880,051 B2 | 4/2005 | Timpanaro-Perrotta | |
| 6,938,135 B1 | 8/2005 | Kekre et al. | |
| 6,993,539 B2 | 1/2006 | Federwisch et al. | |
| 7,003,641 B2 | 2/2006 | Prahlad et al. | |
| 7,035,880 B1 | 4/2006 | Crescenti et al. | |
| 7,225,204 B2 | 5/2007 | Manley et al. | |
| 7,225,208 B2 | 5/2007 | Midgley et al. | |
| 7,225,210 B2 | 5/2007 | Guthrie, II | |
| 7,234,115 B1 | 6/2007 | Sprauve et al. | |
| 7,275,177 B2 | 9/2007 | Armangau et al. | |
| 7,296,125 B2 | 11/2007 | Ohran | |
| 7,346,623 B2 | 3/2008 | Prahlad et al. | |
| 2001/0029517 A1 * | 10/2001 | De Meno et al. | 709/101 |
| 2001/0044807 A1 | 11/2001 | Kleiman et al. | |
| 2002/0004883 A1 | 1/2002 | Nguyen et al. | 711/111 |
| 2002/0049718 A1 | 4/2002 | Kleiman et al. | |
| 2002/0107877 A1 | 8/2002 | Whiting et al. | |
| 2002/0133511 A1 | 9/2002 | Hostetter et al. | |
| 2002/0133512 A1 | 9/2002 | Milillo et al. | |
| 2002/0174416 A1 * | 11/2002 | Bates et al. | 717/128 |
| 2003/0028736 A1 | 2/2003 | Berkowitz et al. | |
| 2003/0131278 A1 | 7/2003 | Fujibayashi | |
| 2003/0135783 A1 | 7/2003 | Martin et al. | |
| 2003/0177149 A1 | 9/2003 | Coombs | |
| 2004/0117572 A1 * | 6/2004 | Welsh et al. | 711/162 |
| 2004/0236958 A1 | 11/2004 | Teicher et al. | |
| 2004/0267836 A1 | 12/2004 | Armangau et al. | |
| 2005/0108292 A1 | 5/2005 | Burton et al. | |
| 2005/0187992 A1 | 8/2005 | Prahlad et al. | |
| 2005/0193026 A1 | 9/2005 | Prahlad et al. | |
| 2007/0185940 A1 | 8/2007 | Prahlad et al. | |

FOREIGN PATENT DOCUMENTS

| | | |
|---|---|---|
| EP | 0 405 926 | 1/1991 |
| EP | 0 467 546 | 1/1992 |
| EP | 0 774 715 | 5/1997 |
| EP | 0 809 184 | 11/1997 |
| EP | 0 899 662 | 3/1999 |
| EP | 0 981 090 | 2/2000 |
| EP | 1349088 | 10/2003 |
| GB | 2256952 | 12/1992 |
| GB | 2411030 | 8/2005 |
| JP | 11259348 | 9/1999 |
| JP | 2000347811 | 12/2000 |
| WO | WO-9303549 | 2/1993 |
| WO | 95/13580 | 5/1995 |

| WO | 99/12098 | 3/1999 |
| WO | WO-03028183 | 4/2003 |

OTHER PUBLICATIONS

Arneson, "Mass Storage Archiving in Network Environments," *IEEE*, 1998, pp. 45-50.

Cabrera et al., "ADSM: A Multi-Platform, Scalable, Backup and Archive Mass Storage System," *Digest of Papers of the Computer Society Conference, IEEE* Comp. Soc. Press, vol. Conf. (Mar. 5, 1995), pp. 420-427.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Rosenblum et al., "The Design and Implementation of a Log-Structure File System," *Operating Systems Review SIGOPS*, vol. 25, No. 5, New York, US, pp. 1-15 (May 1991).

Jason Gait, "The Optical File Cabinet: A Random-Access File System For Write-Once Optical Disks," *IEEE Computer*, vol. 21, No. 6, pp. 11-22 (1988) (see in particular figure 5 in p. 15 and the recitation in claim 5).

U.S. Appl. No. 12/017,923, filed Jan. 22, 2008, Prahlad et al.

First Office Action for Japanese Application No. 2003-531581, Mail date Jul. 8, 2008, 8 pages.

Non-Final Office Action for U.S. Appl. No. 11/672,926, Mail Date Nov. 25, 2008, 21 pages.

Examiner's Report for Australian Application No. 2003279847, dated Dec. 9, 2008, 4 pages.

Non-Final Office Action for U.S. Appl. No. 10/990,353, Mail Date Sep. 15, 2008, 8 pages.

Notice of Allowance for U.S. Appl. No. 10/990,353, Mail Date Apr. 7, 2009, Examiner J. Corrielus, 11 pages.

Final Office Action for Japanese Application No. 2003-531581, Examiner Y. Kudou, Mail Date Mar. 24, 2009, 6 pages.

* cited by examiner

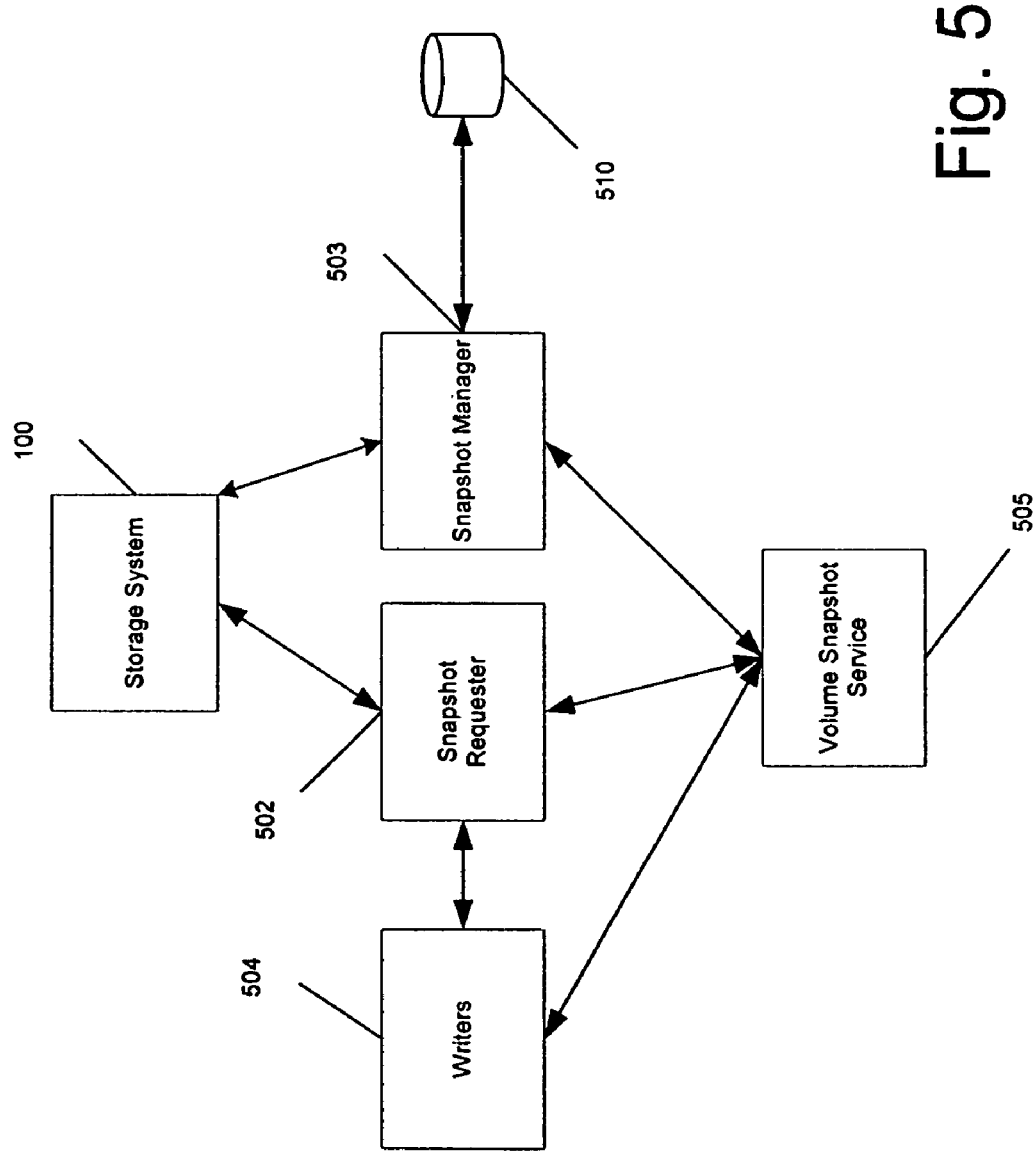

SNAPSHOT STORAGE AND MANAGEMENT SYSTEM WITH INDEXING AND USER INTERFACE

RELATED APPLICATIONS

This application claims priority to Provisional Application No. 60/416,717, filed Oct. 7, 2002 the entirety of which is hereby incorporated by reference.

This application is related to the following patents and pending applications:
- U.S. Pat. No. 5,559,991, titled INCREMENTAL COMPUTER FILE STORAGE USING CHECK WORDS, filed Jun. 27, 1995, issued Sep. 24, 1996;
- U.S. Pat. No. 5,642,496, titled METHOD OF MAKING A STORAGE COPY OF A MEMORY OVER A PLURALITY OF COPYING SESSIONS, filed Sep. 23, 1993, issued Jun. 24, 1997;
- U.S. Pat. No. 6,418,478, titled PIPELINED HIGH SPEED DATA TRANSFER MECHANISM, filed Mar. 11, 1998, issued Jul. 9, 2002;
- Application Ser. No. 09/610,738, titled MODULAR STORAGE AND RETRIEVAL SYSTEM USED IN CONJUNCTION WITH A STORAGE AREA NETWORK, filed Jul. 6, 2000;
- Application Ser. No. 09/609,977, titled MODULAR STORAGE AND RETRIEVAL SYSTEM WITH AN INTEGRATED STORAGE AREA FILING SYSTEM, filed Aug. 5, 2000;
- Application Ser. No. 09/354,058, titled HIERARCHICAL STORAGE AND RETRIEVAL SYSTEM, filed Jul. 15, 1999;
- Application Ser. No. 09/774,302, titled LOGICAL VIEW WITH GRANULAR ACCESS TO EXCHANGE DATA MANAGED BY A MODULAR DATA AND STORAGE MANAGEMENT SYSTEM, filed Jan. 30, 2001;
- Application Ser. No. 09/876,289, titled APPLICATION SPECIFIC ROLLBACK IN A COMPUTER SYSTEM, filed Jun. 6, 2000; and
- Application Ser. No. 09/495,751, titled HIGH SPEED DATA TRANSFER MECHANISM, filed Feb. 1, 2000;

each of which applications is hereby incorporated herein by reference in its entirety in this application.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates generally to a storage system and, more particularly, the invention relates to managing shadow copies.

2. Description of the Related Art

The server operating system by MICROSOFT Corp. of Redmond, Wash. called XP/.NET Server contains an integrated application for making shadow copies. Such shadow copies are also known as "snapshots" and can either be hardware or software copies depending on the snapshot program being used. Common snapshot programs include the previously-mentioned XP/.NET Server snapshot program by MICROSOFT, the TIMEFINDER snapshot program by EMC Corp. of Hopkinton, Mass., and the EVM snapshot program by COMPAQ Computer Corp. of Houston, Tex.

Generally, when a shadow copy is taken by a machine, a new logical volume is created on the machine itself that is an exact image of the original volume. All of the data of the original volume including how application and other software processes recognize and interact with the data is also preserved.

While changes can continue to occur on the original volume, the new volume is a static, point-in-time view of the data. Since shadow copies exist on a user's workstation, or an accessible network machine, the shadow copies provide the ability to have multiple versions of data ready for recovery at a moment's notice. Shadow copies enable minimal restore time, and therefore minimal downtime while the restore operation is being performed, since there is no need to mount external media, such as tape or optical media, to stream data back therefrom during such a restore. This is because the shadow copies are stored on the machine and not on external media.

Although shadow copying offers quick storage and recovery capability, the snapshots are stored on relatively expensive media, such as a fast hard drive, or on a redundant array of independent disks ("RAID") system. RAID refers to a set of two or more ordinary hard disks and a specialized disk controller. The RAID system copies data across multiple drives, so more than one disk is reading and writing simultaneously. Fault tolerance is achieved by mirroring, which duplicates the data on two drives, and parity, which calculates the data in two drives and stores the results on a third. A failed drive can be swapped with a new one, and the RAID controller rebuilds the lost data on the failed drive. Some storage systems copy storages to slower media, such as slow hard drives, tape drives, etc.; however, the downtime associated with a storage and recovery for such systems is increased. Moreover, storage copies are formatted or compressed for optimum utilization of storage media. Restoring such storage copies further require the extra step of unformating or uncompressing the storage copy for use by the computer system. There is therefore a need in the art for a storage system which minimizes the downtime associated with a storage and restore operation while taking advantage of less expensive media.

Additionally, the software products available to create shadow copies, such as the XP/.NET, TIMEFINDER, etc., are not efficiently managed. For instance, administrators in many instances must track shadowed copies, remember which original volume corresponds to particular shadowed copies, what data existed on these volumes, when a copy operation occurred, if a copy should be destroyed, etc. There is therefore a need in the art for a method and system that enables efficient management of shadowed copies.

Additionally, the software products used to make traditional incremental storages monitor changes to volumes at the file level. If a file changes between storages, the entire file is recopied to secondary storage which is inefficient and uses excessive system resources. For example, if two blocks in a 1000 block file changed, all 1000 blocks would be stored again and recopied to secondary storage. Sometimes, these products are used as part of a disaster recovery ("DR") strategy for a company. Files and other important data are sent via a network for storage at a remote site. If anything happens to the primary site of the company such as a fire or other disaster, the files and data are still preserved remotely. Copying files and data using traditional incremental storages and other current storage methods, however, is inefficient since amounts of information must be copied regardless of how much information has changed since a previous storage. There is thus a need for a method, system, and software that enables more efficient incremental storages.

BRIEF SUMMARY OF THE INVENTION

The present invention provides methods, systems, and software products that enable efficient creation, management, and recovery of shadowed copies and quick recovery volumes of primary volumes or applications. Particularly, the invention provides methods and systems for creating a quick recovery volume and snapshot images of primary volumes and application data from a single interface.

The snapshot management tool may integrate with existing storage systems, such as the GALAXY storage system provided by COMMVAULT SYSTEMS of Oceanport, N.J. and further described in application Ser. No. 09/610,738. The present invention leverages the indexing technology and 'point-in-time' browse and recovery capability of such systems to manage shadow copies. Alternatively, the snapshot management tool may act as a stand-alone management tool for basic snapshot management not requiring integration with existing storage systems, such as the COMMVAULT GALAXY storage system and others.

One aspect of the invention is a method of managing stored data in a storage management system, the storage management system including a storage manager, a media agent connected to the storage manager, and a primary volume connected to the media agent. The method comprises taking a snapshot of the primary volume. The method further comprises indexing the snapshot by associating respective information with the snapshot. The method still further comprises copying the indexed snapshot to a secondary volume. The method further comprises repeating the taking, indexing, and copying steps for a plurality of snapshots.

Another aspect of the invention is a computer readable medium including computer executable code for managing stored data in a storage management system, the storage management system including a storage manager, a media agent connected to the storage manager, and a primary volume connected to the media agent. The code enables the step of taking a snapshot of the primary volume. The code further enables the step of indexing the snapshot by associating respective information with the snapshot. The code further enables the step of copying the indexed snapshot to a secondary volume. The code still further enables the step of repeating the taking, indexing, and copying steps for a plurality of snapshots.

Yet another aspect of the invention is a method for replacing data in a primary volume stored at a first device associated with a first logical unit number with data in a recovery volume stored at a second device associated with a second logical unit number, the recovery volume including a plurality of snapshots of the primary volume. The method comprises updating a memory to indicate that the primary volume is no longer associated with the first logical unit number. The method still further comprises updating the memory to indicate that the recovery volume is no longer associated with the second logical unit number. The method further comprises updating the memory to indicate that the recovery volume is associated with the first logical unit number.

Still yet another aspect of the invention is a method for periodically copying changing data on a primary volume, the method comprising capturing a first snapshot of data in a primary volume, the first snapshot being a block level copy of the data in the primary volume. The method further comprises storing the first snapshot; monitoring for a change in any one of the blocks stored in the first snapshot; and storing a copy of a particular block when the monitoring determines that there was a change in the particular block from the first snapshot.

Yet another aspect of the invention is a copy of a primary volume produced by the steps of capturing a first snapshot of data in a primary volume, the first snapshot being a block level copy of the data in the primary volume; storing the first snapshot; monitoring for a change in any one of the blocks stored in the first snapshot; storing a copy of a particular block when the monitoring determines that there was a change in the particular block from the first snapshot; and producing a copy of the primary volume using the first snapshot and any copies of blocks that changed after the first snapshot, after at least one block has changed since the first snapshot.

Still yet another aspect of the invention is a method of managing stored data in a storage management system, the storage management system including a storage manager, a media agent connected to the storage manager, and a primary volume connected to the media agent. The method comprises taking a snapshot of the primary volume; identifying characteristics associated with the snapshot; and storing the characteristics in an index.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5 is a block diagram depicting portions of a storage system according to an embodiment of the invention.

DETAILED DESCRIPTION

Figure 1:
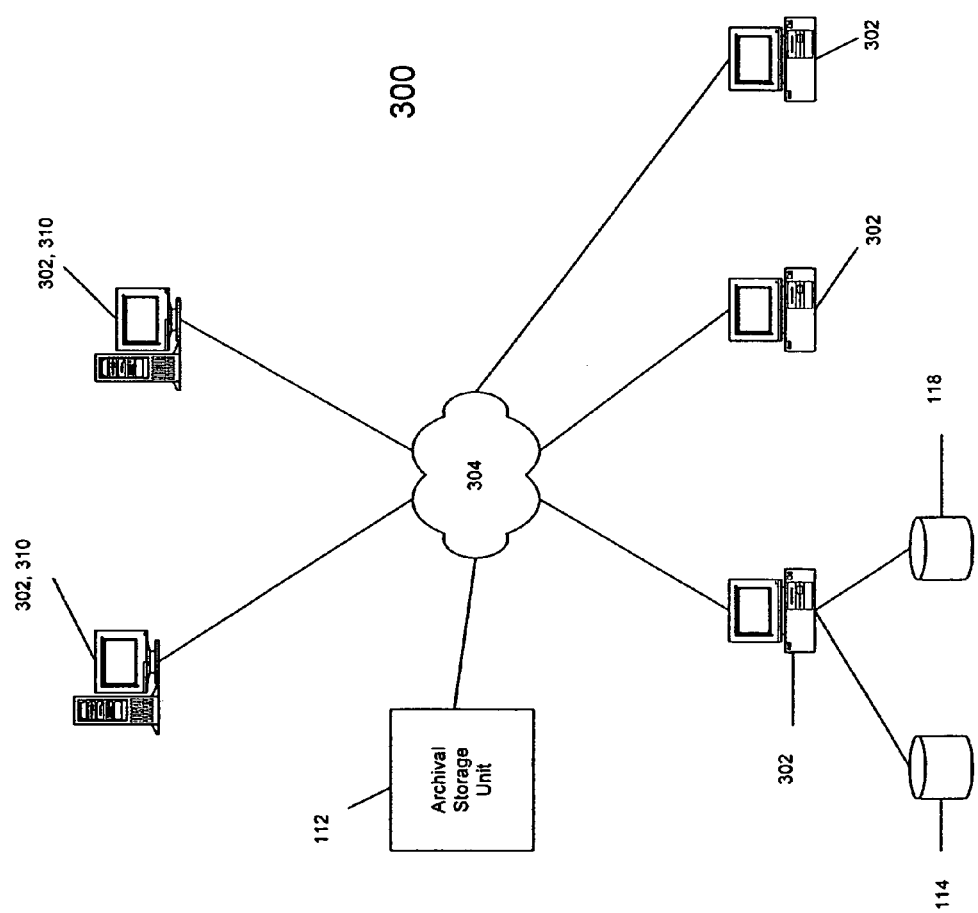
FIG. 1 is a network diagram of a computer system according to an embodiment of the invention

Referring to FIG. 1 a computer system 300, according to the invention, includes a plurality of client computers 302, such as a personal computer, a workstation, a server computer, a host computer, etc. Each client computer 302 includes programming which enables the creation of local quick recovery volumes 118 of a primary volume 114 or of application data as discussed more completely below. That is, the client computer 302 deploying the programming creates a quick recovery volume or volumes that are stored or copied locally at the client computer, such as on a local hard drive, tape drive, optical drive, etc. The programming is deployed on at least one client computer 302 connected over a communications network 304, such as a LAN or SAN, to at least one archival storage unit 112, such as a tape library, a stand alone drive, a RAID cabinet, etc. The client computer 302 includes programming, that facilitates data transfer from the client computer 302 to the archival storage unit 112. At least one of the client computers 302 also acts as a managing computer 310. The managing computer 310 includes programming, such as a media agent or a storage manager discussed below, to control data transfer between the client computers 302 and the archival storage units 112. In FIG. 1 to client computers 302 act as managing computers 304; at least one managing computer providing media agent functionality and at least one managing computer providing storage manager functionality.

Figure 2:
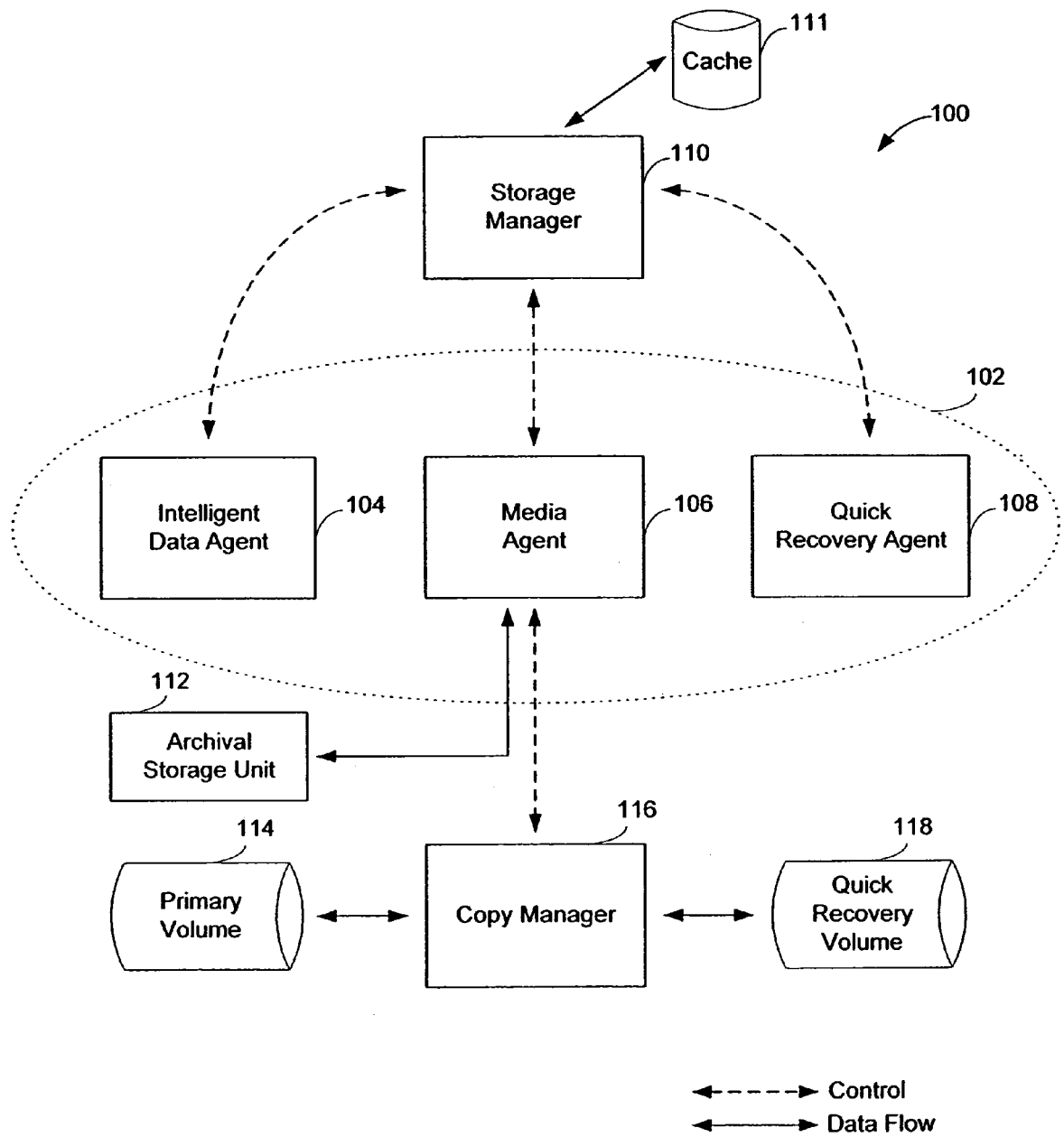
FIG. 2 is a block diagram depicting a storage system according to an embodiment of the invention.

Referring to FIG. 2, there is shown a system 100 for producing quick recovery volumes 118 of a primary data set 114 of a client computer 302, according to an embodiment of invention. System 100, includes at least one agent 102, such as an intelligent data agent 104, e.g., the IDATA AGENT module available with the GALAXY system, a quick recovery agent 108, a media agent 106, e.g., the MEDIA AGENT module available with the GALAXY system, etc., at least one storage manager 110, e.g., the COMMSERVE STORAGE. MANAGER module also available with the GALAXY system, and a cache 111. Agent 102 acts as a liaison between storage manager 110 and copy manager 116.

A primary data set generally denotes a volume, application data, or other data being actively used by a client computer. A volume is generally an area of storage on a data storage device, which may be the whole storage area or portions thereof. An agent 102 generally refers to a program module that provides control and data transfer functionality to client computers. A client generally refers to a computer with data that may be stored, such as a personal computer, workstation, mainframe computer, host, etc. An application is software that utilizes data to be stored such as WINDOWS 2000 File System, MICROSOFT EXCHANGE 2000 Database, etc. Intelligent data agent 104 is an agent for an application that provides control and data transfer functionality for the data of the specific application. A plurality of agents 102, such as intelligent data agents 104 or quick recovery agents 108, may be provided for and/or reside on each client computer, for example, where the client computer includes a plurality of applications and a file system or systems for which a quick recovery volume may be created.

Quick recovery volume 118 is a full replica of an original volume. A full replica is an unaltered copy of the original volume, such as an unformatted or uncompressed copy, as is typically the case with storage copies. Storage using a full replica enables faster recovery for a client computer by simply mounting or pointing to the quick recovery volume as discussed below.

Where a quick recovery volume is being created for one or more volumes and/or applications on a client computer, a sub-client may be created. A sub-client generally refers to a defined set of parameters and policies that define the scope of the data set to be copied, such as the volumes or applications that are going to be copied, recovered, or otherwise managed. A sub-client generally includes a subset of the volumes and applications of the client. Multiple sub-clients may be created for a client computer and the sub-clients may overlap such that they include common data sets between them. A quick recovery volume for a client, sub-client, or a plurality of sub-clients may be directed to point to a quick recovery policy or policies. These policies provide the details for creating a quick recovery volume, such as how snapshots for the volumes or applications are created or, copied, snapshot and quick recovery volume persistence, data pruning, the destination volume of the quick recovery volume, etc.

The destination volume for the quick recovery volume may be a specific volume, or may be selected automatically from a pool of available volumes, e.g., as specified in a storage policy. The quick recovery agent 108 or the media agent 106, selects an available volume as the destination volume where the quick recovery volume will be stored. The quick recovery agent 108 may select the volume at random or target a volume according to the storage space available on a particular volume in comparison to the space needed for the quick recovery volume. Once the volume is selected, it is removed from the pool of available volumes. This may be accomplished, for example, by the media agent 106 determining the capacity needed for a quick recovery volume, determining the capacity of the available volumes, and selecting the volume with a capacity exceeding that needed for the quick recovery volume and closer to the capacity needed than the other volumes.

Media agent 106 is a software module that provides control for archival storage units 112, such as tape library, a RAID system, etc. Media agent 106 facilitates local and remote data transfer to and from the archival storage units, or between the clients' data in primary volume 114 and the archival storage units. Media agent 106 may interface with one or more agents 102, such as intelligent data agent 104 or quick recovery agent 108, to control the data being copied from a primary volume 118 to quick recovery volume 118. A primary volume generally refers to a volume of a client computer that is the original source of the data, e.g. the primary data set, for the quick recovery volume. Data generally refers to information that may be stored on a storage device, including the file system, applications, and information related thereto. For example, the media agent 106 may interface with a quick recovery agent 108 to act as a copy manager 116, which manages the copying of data from primary volumes 114 to the quick recovery volumes 118.

Storage manager 110 is a software module that interfaces with the plurality of agents, clients, storage units, etc., and coordinates and controls data flow between them. A cache 111 or other data structure is communicatively coupled to the storage manager 110, and is generally used to store information such as storage associations, snapshot information, media agent information, intelligent data agent information, quick recovery agent information, and other information used by storage manager 110 according to embodiments of the invention. The primary volumes 114 and the quick recovery volume 118 may be stored via a variety of storage devices, such as tape drives, hard drives, optical drives, etc. The storage devices may be local to the client, such as local drives, or remote to the client, such as remote drives on a storage area network ("SAN") or local area network ("LAN") environment, etc.

Quick recovery agent 108 is a software module that provides the ability to create quick recovery volumes 118. Quick recovery agent 108 evokes a snapshot mechanism or interfaces with a snapshot manager which creates a snapshot image of the primary data set, such as of a primary volume or of application data. The snapshot image of the primary data set is then used to create quick recovery volume 118 of the primary data set as discussed below.

Quick recovery agent 108 is a stand-alone application that adds to or interfaces with snapshot image programming, such as XP/.NET, TIMEFINDER, etc., that create snapshots or shadowed copies of the primary data set for the creation of quick recovery volume 118 of the primary data set. Alternatively, or in addition, quick recovery volume 118 is a disk-to-disk data-block-level volume or application data replication of a client computer.

The snapshot images of the primary data set are stored on fast media, such as a fast hard drive or RAID system. Quick recovery volume 118 may be stored on slow media, such as a hard drive or a tape library. The client computer may be a stand-alone unit or connected to an archival storage unit in a storage area network ("SAN") or local area network ("LAN") environment.

Quick recovery volume 118 is created by first capturing a snapshot image of primary volume 114. Quick recovery volume 118 is subsequently updated to include changes to the primary data set in primary volume 114 by referencing changes appearing in subsequent snapshot images of the primary data set. This may be accomplished by tracking data changes between snapshot images or through the use of multiple snapshots. The snapshot images may include the changed data or simply track the data that has changed. Quick recovery volume 118 may then be incrementally updated in accordance with the data changes or with reference to the tracked changes in the snapshot images. This operation is discussed in more detail below.

Quick recovery volume 118 may be an incremental storage. That is, the operation for creating or updating quick recovery volume 118 may be performed by incrementally copying, from the primary volume 114 to a previous snapshot image or images of the primary data set, blocks of data that have been modified since the previous snapshot images. Alternatively, creating or updating a quick recovery volume may be accomplished by incrementally copying data that has changed from a primary volume to the quick recovery volume with reference to changes tracked in the snapshot image. A plurality of snapshot images of the primary data set are created and the data from the snapshots is incrementally stored between the snapshots to provide redundant quick recovery.

Figure 3:
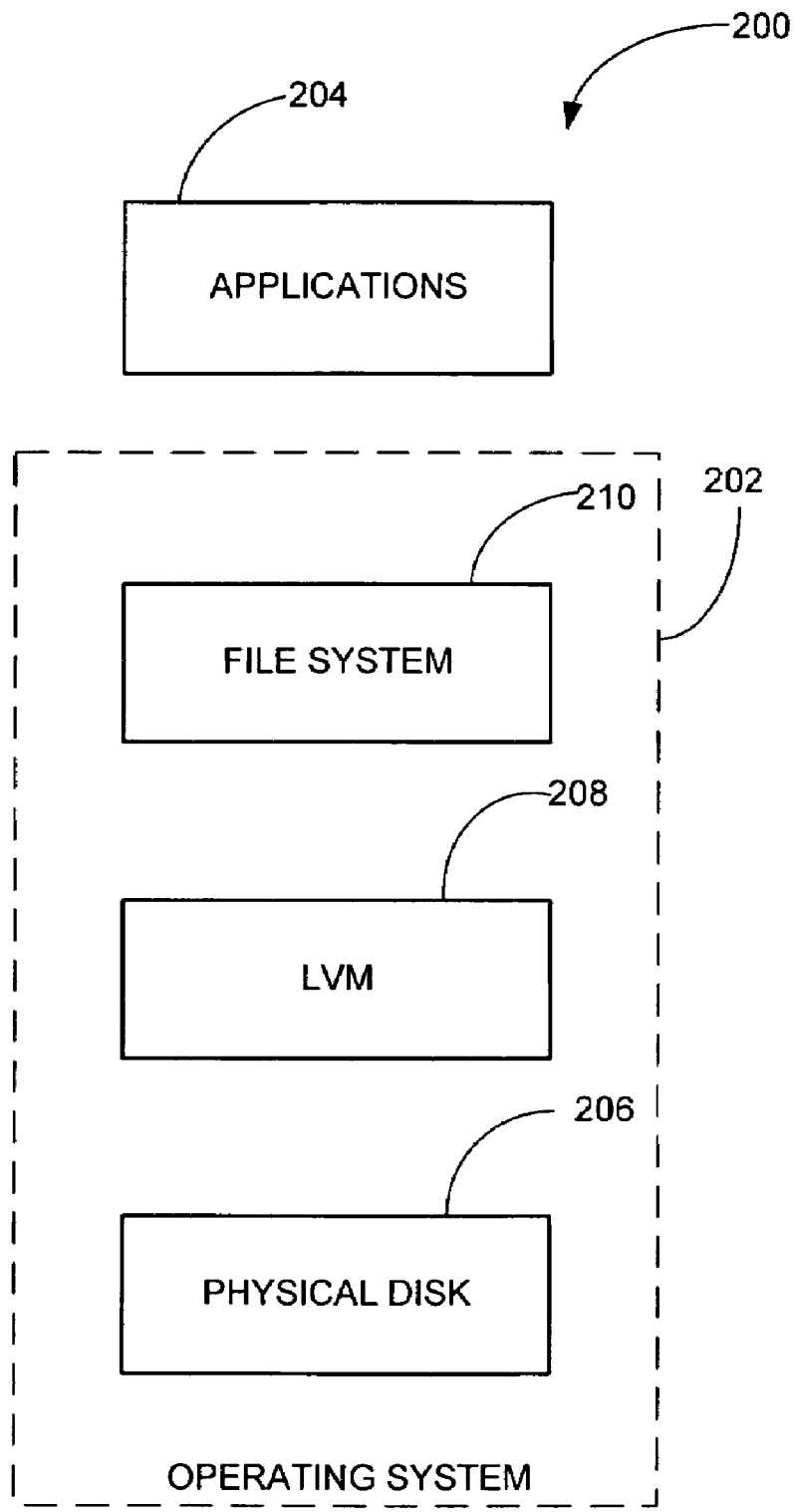
FIG. 3 is a block diagram of a storage system model.

Referring to FIG. 3, a storage system model 200 for a client computer includes a plurality of layers, such as an operating system layer 202 and an applications layer 204. Operating system layer 202 further includes a plurality of sub-layers, e.g., a physical disk layer 206, a logical volume manager ("LVM") layer 208, and a file system layer 210. The physical disk layer 206 includes physical storage devices, such as a magnetic hard drive or disk array. The LVM layer 208 performs logical disk volume management, which allows efficient and flexible use of the physical disk storage, for example, by permitting the physical disk to be divided into several partitions that may be used independently of each other. Some LVMs combine several physical disks into one virtual disk. LVMs may write metadata, such as partition tables, to reserved areas of the physical disk. The LVM virtual disks are transparently presented to upper layers of the system as block-addressable storage devices having the same characteristics as the underlying physical disks.

The file system layer 210 represents a logical view of the data, which typically includes of a hierarchy of nested directories, folders, and files, and metadata. The features and attributes of files may vary according to the particular file system in use. For example, an NTFS, i.e., a WINDOWS NT file system, tracks ownership and per-user access rights on each file, whereas FAT, i.e., file allocation table, file systems do not provide security features. The applications layer 204 includes application software, such as a word processor program, etc. which interface with the file system provided by the operating system to store data. Sophisticated software, such as database management systems ("DBMS"), may use special file system features or even raw logical volumes, to protect the consistency of data and metadata. The consistency of the data and metadata may be maintained during the creation of a quick recovery volume with writers particular to specific applications or file systems. Writers are described in more detail below.

Figure 4A:
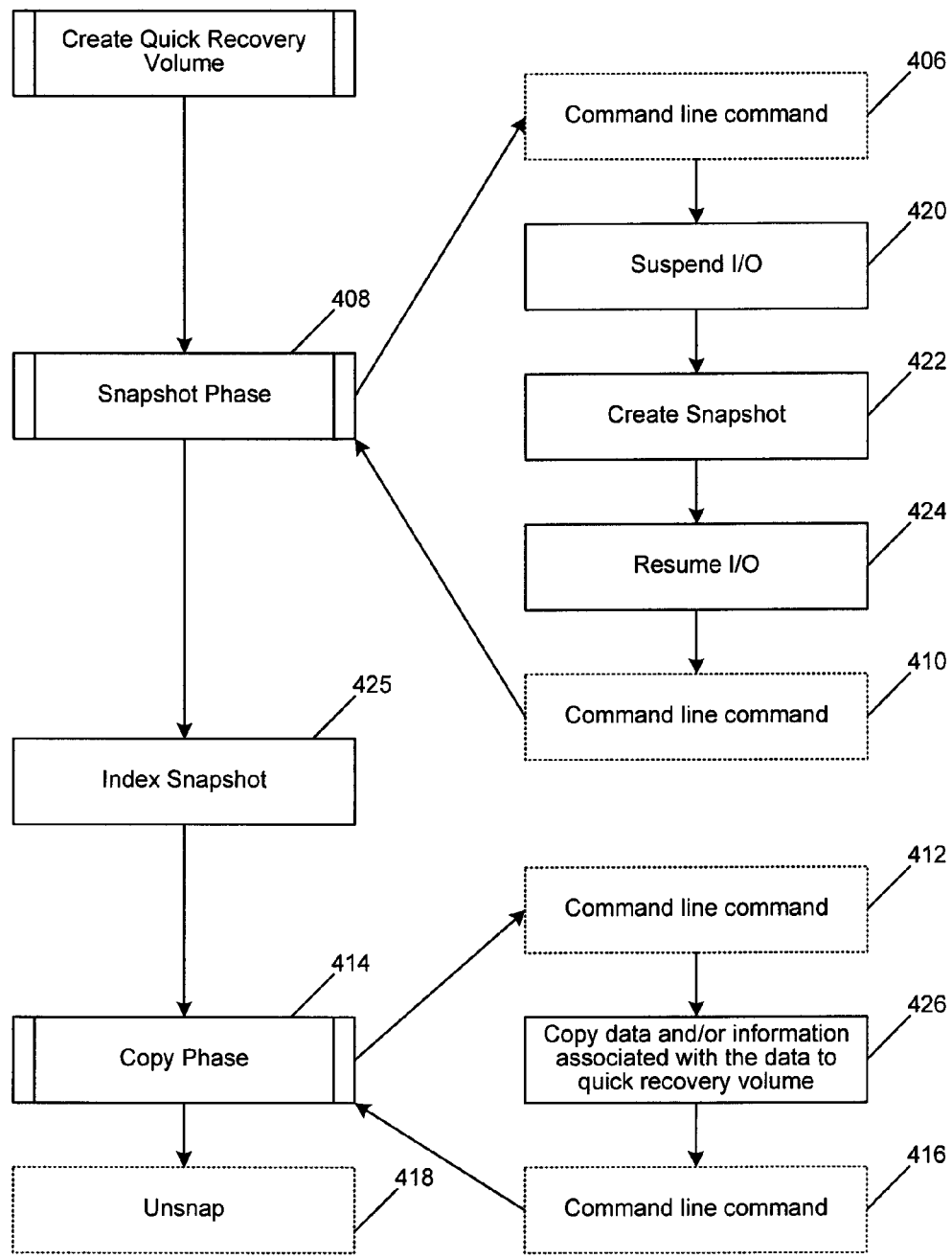
FIG. 4A is a flow diagram illustrating a method of creating a copy of a primary volume of a client computer according to an embodiment of the invention.

Referring to FIGS. 2 and 4A, a method for creating a quick recovery volume of a primary data set of a client computer, according to one embodiment of this invention, is shown. Quick recovery volume 118 is created in two phases, a snapshot phase 408 and a copy phase 414. Each of the snapshot and copy phases may include a plurality of accompanying sub-phases. For instance, the snapshot phase 408 may include a presnapshot 406 and a post snapshot phase 410. Similarly, the copy phase 414 may include a pre-copy phase 412 and a post copy phase 416.

In the snapshot phase 408, quick recovery agent 108 synchronizes with the application to be stored, if any, and the operating system to ensure that all data of the primary data set to be stored is flushed to the archival storage unit or destination disk. In these disks, the quick recovery volume of the primary data set will be stored. The snapshot phase 408 also ensures that the primary volume 114 where the primary data set, such as the primary volume or application data, is located is not modified during the creation of the snapshot image. This may be accomplished by suspending input or output to the primary volume 114 containing the primary data set, step 420, which will ensure that the file system and metadata remain unchanged during the copy operation. Quick recovery agent 108 evokes the snapshot mechanism to create a snapshot image of the primary data set, step 422. The snapshot mechanism or snapshot manager may be a software module, an external snapshot application, such as COMMVAULT SOFTWARE SNAPSHOT, XP/.NET, TIMEFINDER, etc., or a combination thereof. Once the snapshot image of the primary volume 114 is created, application access to primary disk resumes, step 424, and update data on the primary volume 114 as necessary, while the copy operation for the quick recovery volume 118 is in progress or is pending. Once the snapshot image is made the snapshot image is indexed, step 425. Indexing generally denotes associating information with a snapshot image that may be useful in managing the snapshot image, such as the date the snapshot image was created, the lifespan of the snapshot, etc.

During the copy phase 414, the quick recovery volume is created, step 426, from the snapshot image of the primary data set 114. In this way, any suspension in the input or output to primary disk may be minimized. This may be accomplished by media agent 106 referring or pointing quick recovery agent 108 to the snapshot volume or copy as the source of the data for the quick recovery volume 118. The relevant agent or agents may then package the data from the snapshot volume or copy, communicate the packaged data to media agent 106 or quick recovery agent 108, and media agent 106 or quick recovery agent 108 may send the data to quick recovery volume 118 for copy. Packaging generally denotes parsing data and logically addressing the data that is to be used to facilitate the creation of the quick recovery volume. For example, where a snapshot of the MICROSOFT EXCHANGE application is to be created, the EXCHANGE specific intelligent agent will parse the relevant data from the primary disk or disks containing the application data and logically address the parsed data to facilitate rebuilding the parsed data for the quick recovery volume. The copy phase may be performed after a specified amount of time has lapsed since the snapshot phase, such as a day, two days, etc., or at a particular time. Alternatively, a plurality of snapshot images of the primary data set may be created at various times and the oldest snapshot image is copied to the quick recovery volume.

The method of creating quick recovery volumes may differ for particular applications. For example, for the MICROSOFT EXCHANGE 2000 application, prior to suspending input/output to the storage group associated with the application, the entire storage group is dismounted automatically during the snapshot phase 402 and remounted automatically when the snapshot is ready. For the SQL 2000 database, the database may be frozen automatically and released when the snapshot is ready. Suspend and resume functions for particular applications may be accomplished with user-supplied command line commands or script, which may be entered during the presnapshot phase 406 or post-snapshot phase 410. Command line commands or script may further be entered to perform any additional processing that may be required, such as steps to synchronize with an application not supported by the quick recovery agent or to enable storage policies. Alternatively, where an alternate host copy is desired, a command to mount the given volume onto the alternate host can be specified.

During the copy phase 414, quick recovery agent 108 performs a block-level copy of the primary data set from the snapshot image to a destination disk or volume, step 426. The destination disk becomes the quick recovery volume 118. Command line commands or script may also be provided during a precopy phase 412 and a post-copy phase 416. The method of creating quick recovery volume 118 may include an unsnap phase 418, which generally entails deleting the snapshot image that was created during the snapshot phase 408. The snapshot may be deleted at a specified time, such as immediately after the creation of the quick recovery volume or after a persistence period, this period being used so that the resources may be available to create future quick recovery volumes.

Figure 4B:
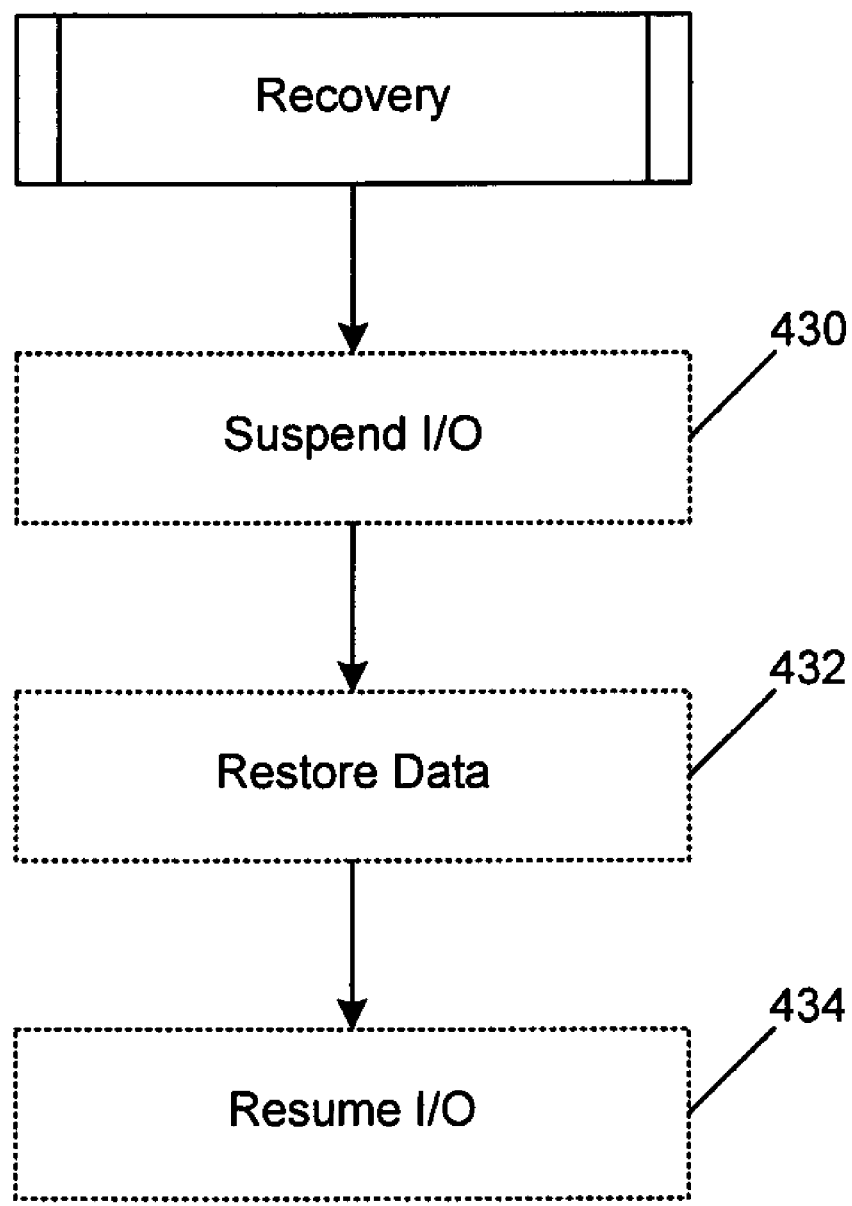
FIG. 4B is a flow diagram illustrating a method for recovering data according to an embodiment of the invention.

Referring to FIG. 4B, there is shown a flow chart outlining the steps enabling a user to recover data from a snapshot image or the quick recovery volume. Recovery includes suspending input or output to the disk containing the quick recovery volume 118 of the primary data set where the data will be copied from, step 430. Thereafter the primary data set is stored to the primary volume 114, step 432. Input or output to the disk is then restored, step 434. Restoring the primary data set, such as application data, includes mounting a volume including the snapshot image of the primary data set, or mounting a quick recovery volume 118 of the primary data set in place of the primary volume, or replacing individual files, folder, objects, etc. to the primary volume from the quick recovery volume. Where a copy of the primary data set replaces a primary volume, input or output to the disk copy is suspended.

Storage software, such as quick recovery agent 108, interfaces with a snapshot manager to access a snapshot image of the primary data set for the creation of quick recovery volume 118. A snapshot manager may be a stand-alone application or program module that controls the creation and management of snapshot images of primary volumes or of application data. Referring to FIG. 5, a snapshot manager 503, is a program module, such as a snapshot manager agent, which interfaces with the storage programming, such as the quick recovery agent 108 in storage system 100. The snapshot manager may be an intelligent agent in that it manages snapshots for a specific application, e.g., WINDOWS 2000 File system, EXCHANGE, ORACLE, etc. A plurality of snapshot managers can be installed on any computer in system 100a to create snapshot copies of a plurality of applications' data.

The creation and management of snapshot images of the primary data set may be further accomplished with a snapshot requestor 502. The snapshot requester 502 is a program module that packages data of particular applications or of primary volumes. When the creation of a snapshot image is requested by quick recovery agent 108, the snapshot requester 502 communicates with a snapshot writer 504 and directs the writer to package the data requested for the snapshot image. Snapshot writers 504 are application specific modules designed to package data from individual applications, such as WINDOWS 2000 file system, MICROSOFT EXCHANGE, ORACLE, etc. After the snapshot writer 502 packages the data, the data is communicated to a volume snapshot service 505, which actually creates the snapshot image of the primary data set. The snapshot writer 504 communicates the packaged data to the snapshot requestor 502, which then passes the packaged data to the volume snapshot service 505.

The volume snapshot service 505 is either a software snapshot application from a software snapshot provider, such as MICROSOFT .NET Server, or a hardware snapshot application from a hardware snapshot provider, such as EMC or COMPAQ. The software snapshot image applications create a space efficient copy that is exposed as a separate logical volume using a copy-on-write technique. Hardware snapshot image applications, typically accompanied with a RAID cabinet, create a mirror or clone copy of application data or primary volumes. Once the volume snapshot service 505 has taken the snapshot image, the snapshot data is passed to the snapshot manager 503, which indexes the snapshot image thereby enabling snapshot management. Indexing generally denotes associating snapshots with information that may be useful in managing snapshots, such as the date the snapshot was created, the lifespan of the snapshot, etc. Managing generally includes, but is not limited to, copying, deleting, displaying, browsing, changing properties, or restoring the snapshots or data therein. Indexing generally provides point-in-time browse and management, such as recovery, and the capability of the snapshot images and of the quick recovery volumes to be viewed and accessed. Users can choose to persist or retain snapshot images well beyond the lifetime of the requesting application or module. The snapshot manager 503 may then communicate the snapshot data to the quick recovery agent 108 for copying to quick recovery volume 118, or to media agent 106 for copying to the archival storage unit 112.

System 100 may use a high-performance data mover for performing a disk-to-disk data transfer. The data mover may also perform server-less data transfer using extended copy to create secondary or auxiliary copies over the communication network, e.g., SAN or LAN. An extended copy command acts as a copy manager, which is embedded on a SAN component, such as a gateway, router, tape library, etc. Alternatively, the copy manager is a program module that interfaces with the storage system. Hardware snapshots may be mounted on an alternate host to perform a server-free storage. This effectively allows a user to convert a software snapshot image to the equivalent of a hardware snapshot image that can be persisted or retained.

Aware technology, described in U.S. patent application Ser. No. 09/610,738, may be incorporated into snapshot image programming or volume snapshot services to make the applications aware. In other words, intelligent data agent 104 makes objects that are native to particular applications part of the snapshot image, which enables the user to perform actions in terms of the applications' objects. This enables, for instance, browsing snapshot images or volumes of EXCHANGE data that will be visible in terms of storage groups and stores, rather than just a volume of directories and files. For particular applications, such as EXCHANGE or SQL Server, a further level of detail with regard to the objects may be included, such as paths to EXCHANGE objects, such as Storage Groups or stores, or paths to SQL objects, such as databases, file-groups, or files. This information may be used at the time of browsing to determine if any of the existing snapshot volumes contain copies of the objects of interest so that they may be presented to the user for recovery. Similar application-aware configurations are provided for applications such as LOTUS NOTES, ORACLE, SHAREPOINT SERVER, etc.

Snapshot manager 503 is accessible to a user with an appropriate user interface screen which enables the creation and management of snapshot images or quick recovery volumes of a primary volume or application data, contained on a client computer. Actions that are available to users include (1) create a snapshot image, e.g., snap, at a specified time (2) snap and persist for a period, (3) specify the destination volume of a snapshot image and where the image should persist (for software snapshot), (4) specify or change the period a snapshot image should persist, (5) browse existing snapshot images, (6) recover a snapshot image to a specified volume, and (7) destroy or delete a snapshot image. Browsing generally denotes enabling a user to view information for particular snapshots. For example, browsing enables a user to view the available snapshots for a particular volume or application data and information related thereto. Recovering generally refers to replacing the primary data set with data from a snapshot image or quick recovery volume, by mounting a volume including the snapshot image or quick recovery in place of the primary volume, replacing application data on the primary disk from a snapshot or quick recovery volume, etc. During a restoration, data may be retrieved from a plurality of quick recovery volumes, snapshot images, or a combination thereof. For example, data may be retrieved from a snapshot image and a quick recovery volume.

Quick recovery volume 118 or a snapshot image of the primary data set may be used on a permanent basis as the primary volume. For example, a user may choose to run an application, such as EXCHANGE, from the quick recovery volume permanently and future storage operations for the application will reflect the quick recovery volume as the primary volume. Setting up a storage volume as the replacement for the primary volume may be accomplished by identifying a quick recovery policy for the storage operation and the storage volumes available to the client, and releasing a volume from the pool of available volumes. This method of recovering a primary volume or application provides a faster way of recovering data since the data transfer from storage copies to the primary copy is effectively eliminated. Moreover, recovering from a quick recovery volume is a faster alternative that traditional storage techniques since the quick recovery volume does not have to be unformatted or uncompressed in order for the client computer to use the data. This method may be performed manually or automatically, and relevant tables or databases, such as snapshot table 510 may be amended to reflect the replacement volume as the primary volume or application for future storage operations.

In each snapshot a user may drill down to view particular folders, files, etc., or to view particular objects native to applications. Users are able to specify, with regard to a quick recovery copy, (1) whether the snapshot image should persist after the creation of the quick recovery volume, (2) if the image should persist, for how long, and (3) the location of the persistent storage for the image. Users are able to (1) request a snapshot image and a quick recovery volume, just a snapshot image, or just a quick recovery volume, (2) request a software snapshot image and optionally specify that it be converted to a hardware snapshot image, (3) request that the hardware snapshot image persist for a certain period of time, (4) recover data from a snapshot image at the volume level, e.g., the whole volume, or sub-volume level, e.g., individual folders, files, objects, etc., and (5) make another copy of a snapshot image on the SAN.

Snapshot information that has been indexed or associated with snapshot images by the snapshot manager 503, is tracked in at least one table or database, e.g., snapshot table 510, which is accessible to the storage system 100 or the storage manager 110. The snapshot table, may include information for every volume or copy that has been configured for every client, application, or, sub-client, indicating the snapshot images that are currently available for a particular volume, application, sub-client, etc. The snapshot information preferably includes a timestamp that indicates when a snapshot was created and a time interval that indicates how long the snapshot should persist. The snapshot table 510 may be accessed by any one of the program modules for managing and controlling the quick recovery volumes.

Snapshot manager 503, enables the following functionality. When a snapshot image of a volume or application is performed, snapshot manager 503 suspends input or output to a disk, determines which applications reside on the primary volume, engages the relevant writers for the particular applications, performs or directs a snapshot, packages the snapshot data, and resumes the input/output to the disk as shown in FIG. 1. The snapshot manager 503 also makes appropriate entries into snapshot table 510 for the given client. When a storage is being performed, the manager 503 identifies the content, identifies the volumes involved, identifies the applications involved, engages all the writers involved, performs or directs the snapshot, and performs or directs the copying to quick recovery volume 118. Appropriate entries are made into the snapshot table 510 for the given client and volumes involved. As part of the creation of a snapshot, snapshot manager 503 enters into the snapshot table 510 parameters relating to how long the snapshot should persist. When a snapshot is destroyed or deleted, snapshot manager 503 performs or directs the deletion of the snapshot and updates snapshot table 510 accordingly.

If the snapshot is a software snap and persistent storage has been identified to convert it to a hardware snap, snapshot manager 503 will first perform a fast copy of the data, such as with DATAPIPE and storage APIs, to accomplish the data movement, and then update the snapshot table 510. Every time snapshot manager 503 is evoked, it re-discovers the volumes on the given client and ensures that any new volumes are added to the default sub-client of an agent, such as the snapshot manager intelligent agent. Snapshot manager 503 can also be called as part of a recovery operation. In that case, a copy of the data is made from one volume to another. In addition, if operating system data, such as metadata, is involved, certain writers may be engaged to ensure a correct data restoration.

Pruning of data is also enabled, such as snapshot images that have expired or their persistence period lapsed. Pruning may be scheduled to run periodically, such as weekly, monthly, etc. If snapshot images are present and their persistence period has lapsed, the snapshot image is destroyed or deleted and the snapshot table is updated accordingly.

The discussion above assumes that snapshot manager 503 encapsulates logic to manipulate the built-in shadow copy mechanism in WINDOWS .NET Server. Manager 503 can easily encapsulate the same logic for any hardware snapshot recognized by those skilled in the art. Manager 503 may be implemented in conjunction with plug-in modules, or dynamic link libraries ("DLLs"), that will each support a different snapshot program such as .NET, TIMEFINDER, EVM, etc.

Figure 6:
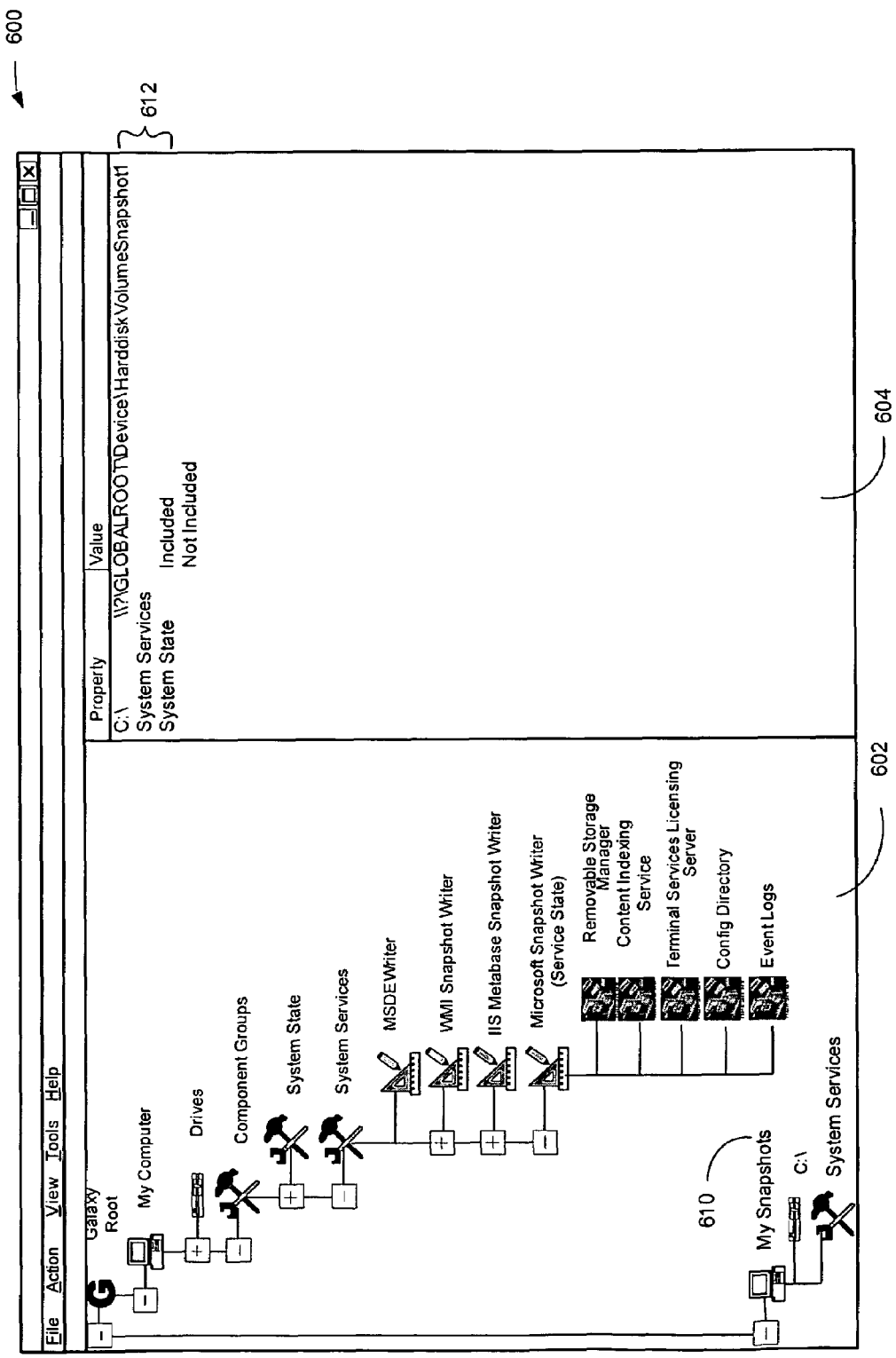
FIGS. 6 and 7 are pictures of browser style user interface screens according to an embodiment of the invention.

The invention provides a user interface screen so that a user may browse and recover data, such as from snapshot images, quick recovery volumes, primary copies, storage copies, etc., as of a point in time. Browsing and recovery may be by client, sub-client, volume, and application specific, and may be at the volume level or at the sub-volume level. Volume level recovery refers to replication of entire volumes, whereas sub-volume level refers to recovery at a folder, file, or object level. Referring to FIG. 6, there is shown a browser interface screen 600, according to the invention. Screen 600 includes a plurality of frames, such as directory frame 602 and a contents frame 604. The directory frame generally provides a list of all available drives, partitions, volumes, snapshots, storages, etc. and the file folders therein, of a client computer in a hierarchical arrangement. The contents frame 604 generally lists the contents of any item appearing in the directory frame 602, such as folders, files, or objects. The contents may be displayed by highlighting any one of the items in the directory frame 602. By selecting the "My Snapshots" folder 610, for example, the contents 612 of the snapshots folder 610 are displayed in the contents frame 604. The contents may be displayed with relevant details, such as the date of creation, persistence, association, the capacity of the volume, etc. A user may change the properties of a snapshot, such as how long a particular snapshot will persist, the location, etc., and the user may direct the creation of another volume or copy of a software snapshot using, for example, COMMVAULT data movers.

Users may specify a time for which browsing and restoration may occur. In that instance, the browser application determines if there are any existing snapshot images present as time specified. If the browser application does not find a snapshot, storage copies, such as primary copies, and secondary copies, and quick recovery volumes are presented or accessed for data recovery or restoration. If the user chooses to drill down a given snapshot image, quick recovery volume, or storage copy to see the contents therein, the item is displayed at the requesting client computer in an appropriate user interface screen, such as in an interface screen provided by the application associated with the item.

The snapshot folder and contents displayed at the user interface may be provided by browse logic that checks the snapshot table 510 to see if there is a snapshot available as of the specified time for volumes or copies of interest. If there is a snapshot available, data relating to the content of the snapshot is displayed accordingly. Application specific objects are mapped to data files or directories and the mapping is stored in database tables. This allows for an application-specific view of objects on the snapshot when the snapshot is browsed or recovered. For example, where a snapshot of C:\ volume has been created, browsing under the heading "My Snapshots" may reveal a C:\ volume that is a snapshot image of the C:\ volume. Alternatively, snapshot images may be designated with different labels. For example, the snapshot volume of C:\ may be V:\. with a label indicating that V:\ is a snapshot volume of C:\. Drilling down through the snapshot and the folders therein may reveal the file, folders, or objects, which may be viewed, recovered, restored, deleted, etc. For example, a file "important.doc" appearing in the snapshot of the C:\ volume may be viewed with a document viewer, deleted, recovered, or restored to the primary volume.

Figure 7:
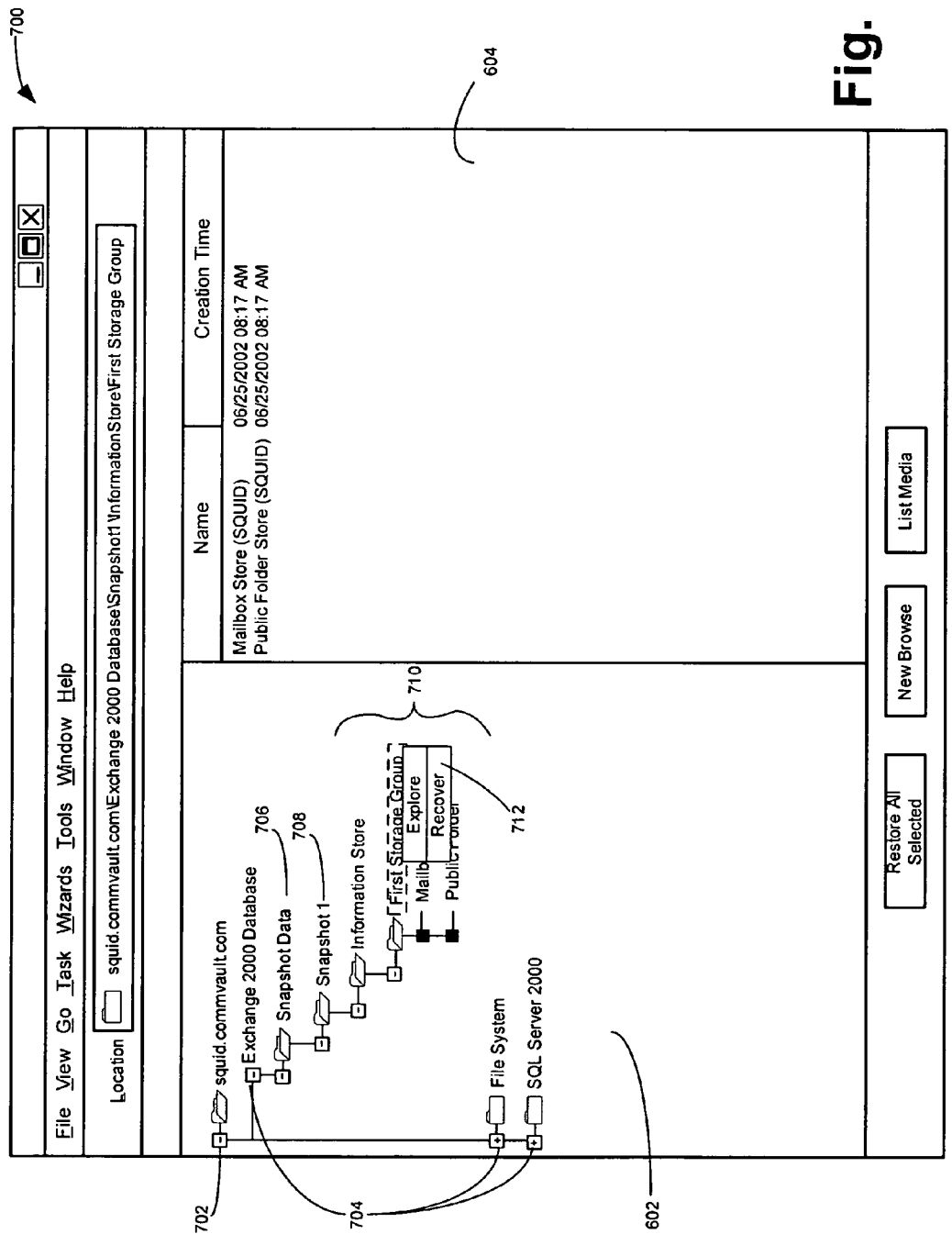

Referring to FIG. 7, there is shown browser interface screen 700. Screen 700 allows for browsing snapshot images according to the invention and displays a particular client 702 as a folder, for example, a folder for the client squid.commvault.com. At least one subfolder 704 may be displayed showing the application or applications available with respect to the client for creating storage copies, browsing, and recovery; for example, "Exchange 2000 Database," "File System," and "SQL Server 2000." Selecting one of the subfolders, such as "Exchange 2000 Database" reveals further subfolders therein, such as a "SnapShot Data" subfolder 706, which provides snapshot data for the selected application. Further drilling down through the subfolders will cause to be displayed in a hierarchical layout the snapshots available, such as "SnapShot 1" 708, application objects 710, such as the "Information Store," "First Storage Group", "Mailbox Store", "Public Folder Store", etc. A user may then perform a single click recovery or restore, or creation of a snapshot image or quick recovery volume of a primary volume or application data, or of any storage copy, by selecting the level from which the data displayed thereunder will be stored or recovered. For example, by selecting "First Storage Group" and right clicking, the user will be presented with an activity window 712, which allows the user to select the "Recover" function. In this instance, by selecting "Recover" all data related to the objects appearing under the "First Storage Group" will be recovered. The user may choose to recover a single file, or a single object, such as a single EXCHANGE store or SQL Server database. The restoration may be implemented with a fast data mover, such as COMMVAULT'S DATAPIPE described in detail in application Ser. No. 09/038,440, which moves data from disk to disk. Additionally a disk-to-disk server-less data mover can be implemented as well.

The user interface screen may be used to recover a data set, such as the primary volume or application data, from a given snapshot copy or quick recovery volume. If an entire data set is to be recovered, the snapshot image or quick recovery volume may be substituted for the original volume, such as with the recovery process described above. Recovery of items smaller than a volume can be accomplished by using traditional file copy techniques or with WINDOWS EXPLORER, such as by copying and pasting the desired files or objects. Depending on the files or objects being recovered, the recovery process may involve identifying which writers 504 (FIG. 5) were involved at the time of the snapshot and then engaging them to accomplish the restoration.

The user interface screen may also be used to request destruction of a given snapshot copy on a single item basis or automatically upon the lapse of the persistence period. Basic information for each snapshot copy destroyed, or otherwise, may be stored for purposes of tracking and display. This information may be stored in an MSDE database, but can also be stored in other similar data structures.

Figure 8:
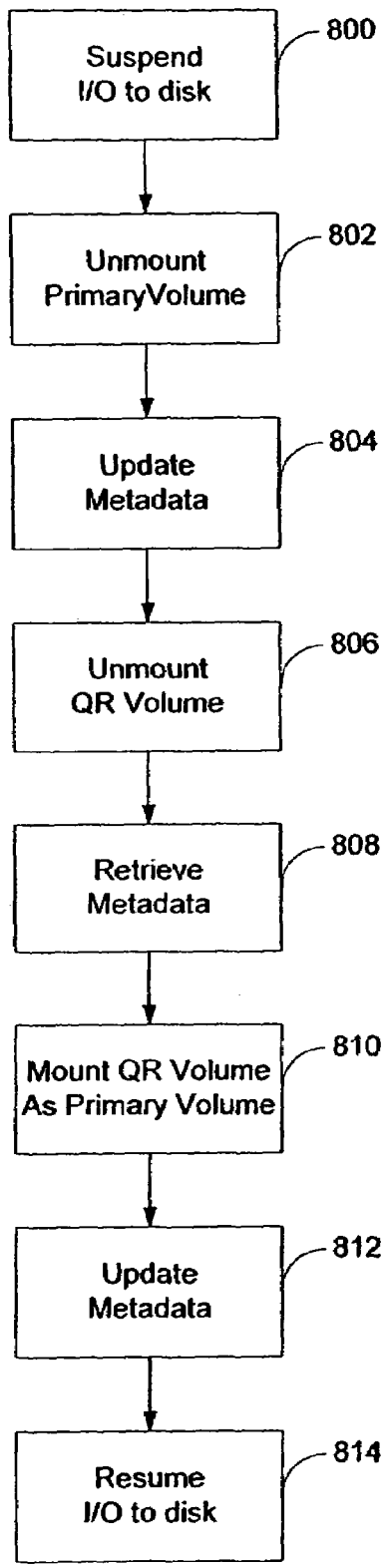
FIG. 8 is a flow diagram illustrating a method for mounting a quick recovery volume in place of a primary volume according to an embodiment of the invention.

Referring to FIG. 8, in conjunction with FIG. 1, there is shown a flow diagram showing a method of mounting a quick recovery volume 118 in place of a primary volume 114 according to one embodiment of the invention. Mounting a quick recovery volume 118 in place of a primary volume 114 may take place when, among other things, recovering from the primary volume 114 is not desirable. For example, the primary volume 114 may be damaged or unable to accept recovery data. Alternatively, users may wish to free the primary volume 114 for use with other applications or to upgrade the physical drive on which the primary volume 114 is stored. In the prior art, recovery from a recovery volume typically required streaming data over a network. The invention does not require such streaming as is discussed below.

During mounting, quick recovery agent 108 suspends input and output operations of the disk or other storage device containing the primary volume 114, step 800. I/O operations are suspended in order to synchronize the applications, if any, and the operating system with the data set of the quick recovery volume 118 being mounted.

The primary volume 114 is unmounted, step 802. Mounting a volume or device includes making a group of files or other data in a file system structure or other data structure accessible to an application, an operating system, a process, or other computerized element of the system. Mounting also can be used to indicate that a volume or device is physically accessible to the system. Applications and other software-related elements of system 100 recognize volumes according to logical drive/device names or logical locations. For example, in a MICROSOFT WINDOWS environment, an EXCHANGE server might recognize the primary volume 114 by the logical drive/device name of "g:". In a UNIX environment, volumes are recognized by the logical location they occupy in the file system tree hierarchy and thus the primary volume might instead be known as "/user/local/mail". Regardless of whether the primary volume 114 is identified by logical drive/device name, by logical location, or by other means, these logical identifiers all correspond to the physical device on which the primary volume 114 is stored.

While software-related elements of the system thus recognize physical devices according to logical identifiers, hardware-related elements of the system generally do not. Instead, hardware-related elements of the system such as system buses, system processors, and other elements, generally recognize physical devices by a Logical Unit Number ("LUN"). LUN is a unique identifier which distinguishes a device from other devices sharing the same Small Computer Systems Interface ("SCSI") bus or other hardware resource.

Since software-related components generally will not recognize devices according to a device's LUN, the LUN should be translated or otherwise associated with a corresponding logical identifier such as a logical drive or logical location that the software-related components recognize. This translation is generally performed and managed by the operating system.

As shown in FIG. 2, storage manager 110 maintains a cache 111 or other data structure containing metadata which tracks, among other things, associations between device LUNs and their corresponding logical identifiers. The storage manager 110 instructs the operating system to unmount the primary volume, step 802, and updates the metadata in the cache 111, step 804, to indicate that the logical identifier for the primary volume 114 is no longer associated with the LUN for the device on which the primary volume 114 is stored. For example, if the primary volume 114 is an EXCHANGE data store located on LUN 1 and recognized by EXCHANGE as g:, the storage manager 110 instructs the operating system to remove the association between LUN1 and g: (thus unmounting g: as the primary volume 114), and then update the metadata in the cache 111 to indicate that g: is no longer at LUN1.

Quick recovery volume 118 is also unmounted, step 806, when storage manager 110 removes the association between the LUN for the device on which the quick recovery volume 118 is stored and the logical device identifier for that device. Following the preceding example, if a quick recovery volume 118 for the Exchange data store is on LUN2 and recognized by the system as h:, the storage manager 110 instructs the operating system to remove the association between LUN2 and h: (thus unmounting h: as the quick recovery volume 118), and then updates the metadata in the cache 111 to indicate that h: is no longer at LUN2.

The metadata from the cache 111 also records the logical identifiers by which applications, processes, and other elements of the system recognize volumes of the system. For example, when the system unmounts a primary volume 114 that EXCHANGE recognizes as the logical drive g:, the association between g: and EXCHANGE is still preserved in the cache 111 even though g: is unmounted. Thus, the system retrieves the metadata in the cache 111, step 808, indicating the logical device identifier by which applications, processes, and other elements of the system previously recognized the primary volume 114 of the system. This metadata is used as input to mount the quick recovery volume 118 in place of the primary volume 114, step 810. The storage manager 110 instructs the operating system to make a new association between the LUN for the device on which the quick recovery volume 118 is stored and the logical device identifier previously used by applications, processes, and other elements of the system to recognize the primary volume 114. Storage manager 110 also updates cache 111 with the new association, step 812. The logical device identifier by which applications, processes, and other elements of the system recognize the primary volume 114, now points to the LUN for the quick recovery volume 118 and the quick recovery volume 118 has effectively become the primary volume 114. I/O to disk is resumed, step 814, and applications, processes, and other elements of the system can access the former quick recovery volume 118 mounted as the primary volume 114.

The device on which the quick recovery volume 118 is stored may be a tape library or other type of archival storage device with a relatively slow data access rate. In the embodiments mentioned above, quick recovery volume 118 may still be mounted in place of the primary volume 114 as described above. The process is transparent to users and generally controlled and directed by the storage manager 110. After a quick recovery volume 118 is mounted in place of a primary volume 114, the system may use auxiliary copy or other methods as known in the art to copy the quick recovery volume 118 to a storage device with a faster data access rate. Quick recovery volume 118 may be stored remotely, and thus when the quick recovery volume 118 may be mounted in place of the primary volume 114, latency occurs as data must travel over a network for use by applications, processes, and other elements of the system. To solve this problem, the system may use auxiliary copy or other methods known in the art to copy the quick recovery volume 118 to a local storage device and mitigate latency.

Figure 9:
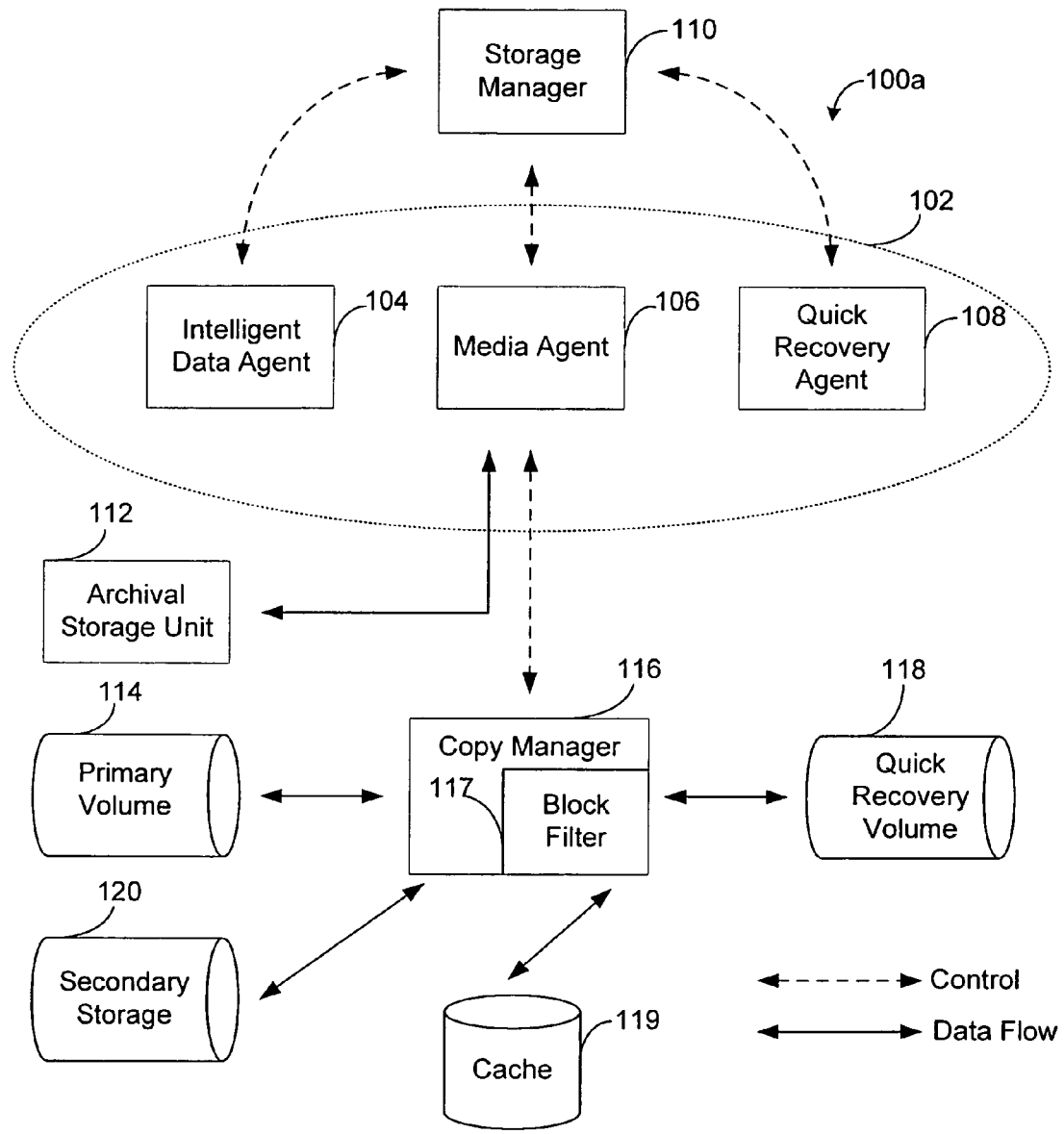
FIG. 9 is a block diagram depicting a storage system according to an embodiment of the invention.

Referring now to FIG. 9, there is shown another system 100a in accordance with the invention. Elements which are similar to those shown in FIG. 1 are given the same reference designators. As shown in FIG. 9, copy manager 116 includes a block filter 117 which is a software module that tracks changes to primary volume 114 as further described herein. A cache 119 or other data structure is communicatively coupled to copy manager 116, and is generally used to store information such as snapshot information, block-level change and storage information, copy manager information, intelligent data agent information, and other information used by the copy manager according to embodiments of the invention. Block filter 117 uses cache 119 to track changes to primary volume 114 as further described herein. Block filter 117 may also reside on intelligent data agent 104, quick recovery agent 108, or storage manager 110. A secondary storage 120 such as a tape library or other storage system stores copies of snapshots, quick recovery volumes 118, incremental storages, full storages, and other information used by the system.

Figure 10:
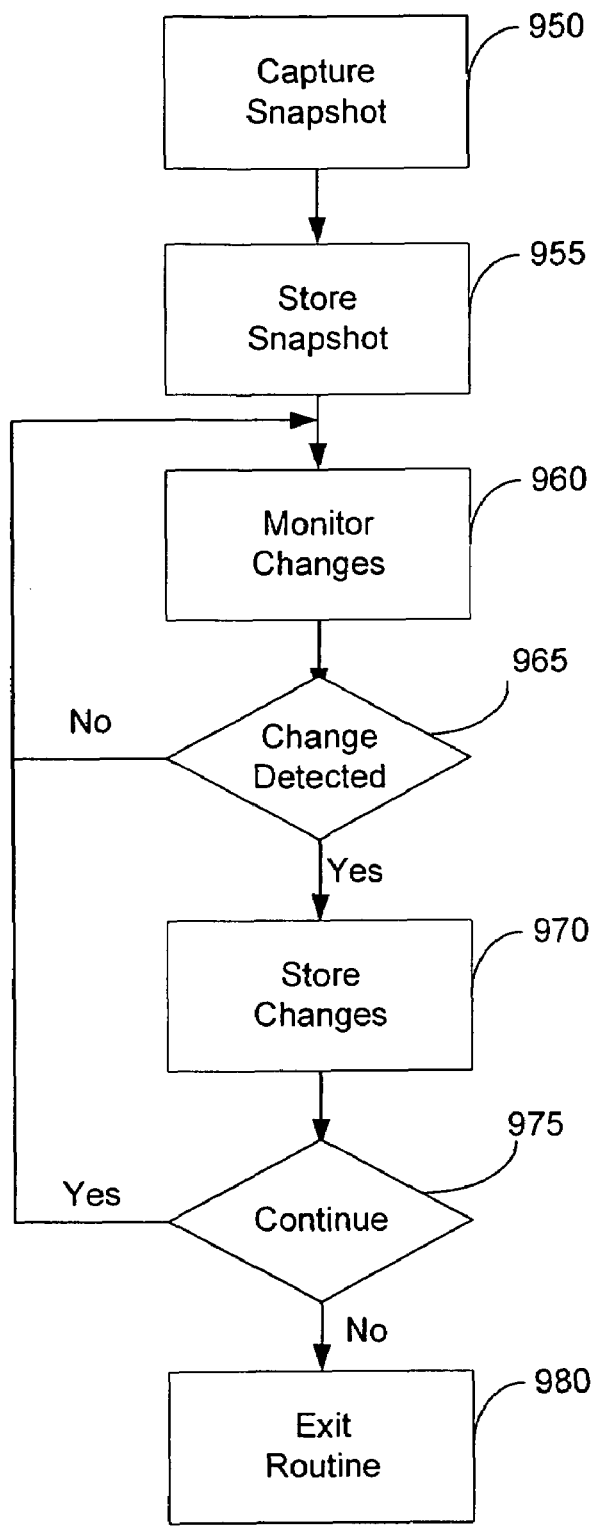
FIG. 10 is a flow diagram illustrating a method for producing a copy of a primary volume according to an embodiment of the invention.

FIG. 10 is a flow diagram showing a method of performing raw partition incremental secondary storage operations according to an embodiment of the invention. Referring to FIGS. 9 and 10, quick recovery volume 118 preserves not only the data of primary volume 114, but also how applications and other processes recognize and interact with that data. For example, the system preserves the logical identifiers used by applications to recognize volumes. System 100a also conveys and preserves application-level data by, among other techniques, copying data at the block level when taking a snapshot and not copying at merely the file level. Blocks of data captured in a snapshot are thus captured and copied as they are laid out on the disk or other storage media.

Normal partitions generally are formatted with a file system which allows a hierarchical structure of files and directories to be created. A raw partition, by contrast, is a partition that does not contain a file system. Raw partitions can be advantageous, for example, since they sometimes offer performance improvements over partitions with file systems for some types of applications. File system overhead and address translation is often eliminated. For example, database block addresses map directly to raw partition addresses, and thus some databases such as ORACLE by ORACLE Corporation of Redwood Shores, Calif. use raw partitions for storing their database files.

Since there is no file system on raw partitions, information stored on a raw partition cannot be accessed by name or other file system-related identifier. Instead, information stored on raw partitions is stored at the block level and identified accordingly. Snapshots, which capture data at the block level, can thus be used according to the method disclosed below to perform raw partition incremental storage operations.

Still referring to FIGS. 9 and 10, system 100a captures a snapshot of primary volume 114, step 950. As previously described, the snapshot contains a block level copy of the data on primary volume 114. Intelligent data agent 104, which can be aided by the copy manager 116, packages the snapshot into a backup format or other format and copies the snapshot to secondary storage 120, step 955. For example, intelligent data agent 104 may package a snapshot according to GALAXY'S format or another backup format or secondary storage format as further described in U.S. Pat. No. 5,559,991, U.S. Pat. No. 5,642,496, and U.S. Pat. No. 6,418,478 all of which are hereby incorporated herein by reference in their entirety. Intelligent data agent 104 packages additional information with the snapshot such as information regarding how applications recognize the snapshot data, where snapshot data is physically located on the primary volume 114, where snapshot data is logically located on the primary volume 114, application-specific preferences associated with the snapshot data, and other information. The additional information can be included, for example, in header information of the snapshot data being copied to secondary storage 120, in the payload of the snapshot data being copied to secondary storage 120, or in combinations thereof. Intelligent data agent 104 may avoid packaging the snapshot into a backup format, and instead copy the snapshot in its original format to secondary storage 120, for example, in the case of creating a quick recovery volume in secondary storage.

Block filter 117 monitors the primary volume 114 for changes, step 960. The block filter 117 compares the blocks of primary volume 114 against information stored in cache 119 regarding the state of the blocks of primary volume 114 at the time of the previous snapshot. If the state of a block is different on the primary volume 114 from the state of the block recorded in the cache 119, then block filter 117 indicates that a change has occurred to the block on primary volume 114. As previously described, block filter 117 is a software module or other daemon that monitors the primary volume 114 in real time. Block filter 117 checks the primary volume 114 for changes as directed by a user or according to a scheduled frequency such as a frequency specified by a storage policy. Block filter 117 also monitors for incremental block level changes that occurred since a previous snapshot.

Figure 11:
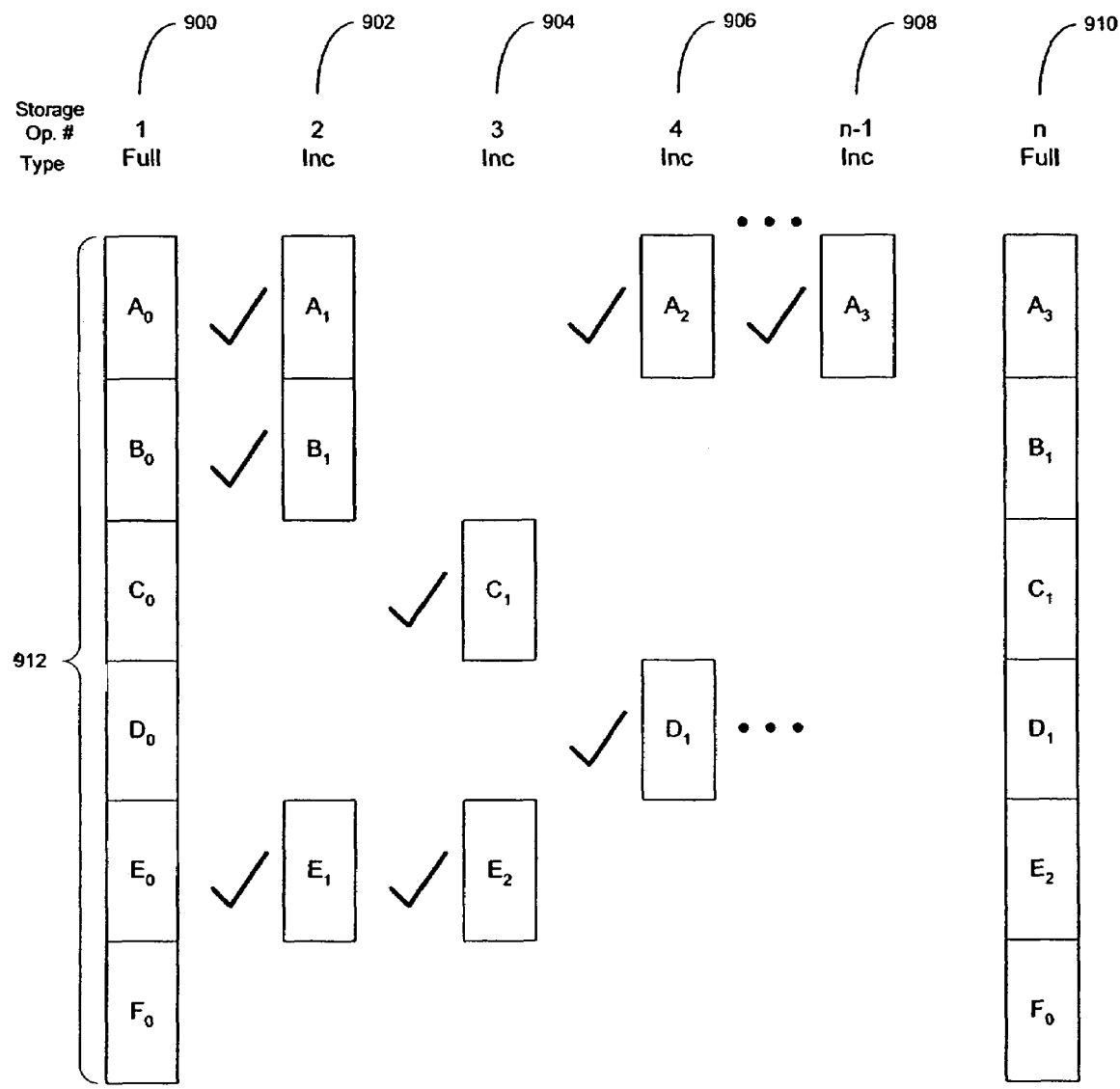
FIG. 11 a block level diagram illustrating incremental changes to a memory in accordance with an embodiment of the invention.

Turning to FIG. 11 block diagram is shown depicting incremental block level changes occurring in a series of raw partition storage operations according to an embodiment of the invention. FIG. 11 shows a first storage operation 900, a second storage operation 902, a third storage operation 904, a fourth storage operation 90, a fifth storage operation 908, a sixth storage operation 910, and a number of blocks 912 being copied. First storage operation 900 is a full snapshot of a raw partition primary volume 114 comprising six blocks 912 $A_0$, $B_0$, $C_0$, $D_0$, $E_0$, and $F_0$. First storage operation 900 stores a snapshot of the blocks 912 in their original or base state. Block filter 117 monitors primary volume 114 for changes that occur to blocks 912 since the first full snapshot 900 was made.

For example, second storage operation 902 is an incremental snapshot of the primary volume blocks that changed since first storage operation 900. An incremental storage operation or snapshot stores only copies of those elements of the volume that have changed since a previous storage operation. As shown, only $A_0$, $B_0$, and $E_0$ have changed since first storage operation 900, and so system 100 takes an incremental snapshot and stores only the changed blocks $A_1$, $B_1$, and $E_1$. Third storage operation 904 is also an incremental snapshot and stores copies of only those blocks that changed since second storage operation 902. Thus, $C_1$ and $E_2$ are stored. Fourth storage operation 906 is another incremental snapshot and causes copies of blocks $A_2$ and $D_1$. Fifth (n–1) storage operation 908 is another incremental snapshot and causes a copy of block $A_3$.

Storage operations continue until another full snapshot is taken. Sixth (n) storage operation 910 presents another full snapshot of the raw partition primary volume 114. Sixth (n) storage operation 910 stores a full snapshot of the blocks 912 capturing the changes that occurred to all the blocks 912 since first storage operation 900. Sixth (n) storage operation 910 may be made as a synthetic storage operation. A synthetic storage operation takes a previous full storage operation of a volume and incorporates changes to the previous full storage operation recorded in one or more incremental storage operations to create an updated full storage operation without using the system resources that would be required to make a second storage operation directly from the volume itself. For example, here sixth (n) storage operation 910 is a full snapshot of the first volume 114 created by combining the most recent change to $A_0$ stored as $A_3$ in fifth storage operation 908, the most recent change to $B_0$ stored as $B_1$ in second storage operation 902, the most recent change to $C_0$ stored as $C_1$ in third storage operation 904, the most recent change to $D_0$ stored as $D_1$ in fourth storage operation 906, the most recent change to $E_0$ stored as $E_2$ on the third storage operation 904, and $F_0$ (which has not changed) from first storage operation 908. Since the sixth (n) storage operation 910 is a full snapshot of the first volume 114 created via synthetic copy, the system does not need to take another full snapshot of the first volume 114.

Returning to FIG. 10, when the block filter 117 detects a change to one or more blocks on the primary volume 114, step 965, the system performs an incremental storage operation of any changed blocks and copies only the changed blocks to secondary storage 120, step 970.

Intelligent data agent 104, which can be aided by copy manager 116, packages the changed blocks into a storage operation format and performs the incremental storage operation to secondary storage 120. Intelligent data agent 104 packages additional information with the changed blocks such as information regarding how applications recognize the changed block data, where changed block data is physically located on the primary volume 114, where changed block data is logically located on the primary volume 114, application-specific preferences associated with the changed block data, and other information. The additional information can be included in header information of the changed block data being copied to secondary storage 120, in the payload of the changed block data being copied to secondary storage 120, or in combinations thereof. Intelligent data agent 104 may also copy the changed blocks in their original format to secondary storage 120.

Block filter 117 queries storage manager 110 or other controlling process or policy whether it should continue to monitor block level changes to primary volume 114, step 975. Control either returns to step 804 and block filter 117 continues to monitor changes, or the routine exits, step 980.

Snapshot data and incremental block level changes to snapshot data may be copied to remote secondary storage, 120. For example, system 100a may be integrated with a company's remote disaster recovery strategy since incremental block level changes can be copied thereby reducing network overhead generally associated with remote disaster recovery operations. Intelligent data agent 104, which can be aided by the copy manager 116, may package the snapshot data and incremental block level changes to the snapshot data into a backup format, and back up the data over a network to remote secondary storage 120. System 100a uses transport protocols known in the art such as TCP/IP, Ethernet, Gigabit Ethernet, and other protocols. System 100a may use the COMMVAULT DATAPIPE further described in U.S. Pat. No. 6,418,478 which is incorporated herein by reference in its entirety. System 100a may use additional information communicated with the snapshot data and block level incremental changes to snapshot data such as information regarding how applications recognize the data, where the data is physically located on the primary volume 114, where the data is logically located on the primary volume 114, application-specific preferences associated with the data, and other information, to unpack the data at the remote secondary storage 120 location and to create a remote quick recovery volume 118.

Thus, by indexing the snapshots taken of the primary volume, the snapshots may be managed effectively in the recovery volume and browsing features are enabled. Additionally, by remapping the associations of LUN numbers, a recovery volume can replace a primary volume without the need for actually streaming the data from the recovery volume. Finally, by mounting changes in each block of a snapshot, a quick recovery volume may be created even when the primary volume data is stored at the block level and may be created using less recovery than required in the prior art.

Some of the embodiments of the present invention leverage existing features of the COMMVAULT GALAXY backup system. It will be recognized by those skilled in the art, however, that the embodiments of the present invention may be applied independently of the GALAXY system.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of creating a quick recovery volume of a primary volume of data in a storage management system, the storage management system including a storage manager, a media agent connected to the storage manager, and a primary volume connected to the media agent, the method comprising:
    performing a snapshot operation, wherein performing the snapshot operation includes:
        quiescing the primary volume of data;
        taking a first snapshot of the primary volume of data;
        after the first snapshot is taken, dequiescing the primary volume of data; and
        indexing the first snapshot by associating respective information relating to individual files within the primary volume of data with the first snapshot; and
    performing a copy operation, wherein the copy operation is performed after the primary volume is dequiesced and includes:
        selecting the first snapshot as a source of data to copy to a quick recovery volume, wherein the quick recovery volume includes information about an application that created the data of the primary volume;
        parsing the data to be copied to the quick recovery volume;
        logically addressing the data to be copied to the quick recovery volume,
        performing a block-level copy of the parsed and logically addressed data of the selected first snapshot to the quick recovery volume; and
        deleting the selected snapshot after the block-level copy is complete.

2. The method as recited in claim 1, further comprising:
    displaying the first snapshot to a user, wherein displaying the first snapshot includes displaying information associated with an application that created data tracked by the first snapshot.

3. The method of claim 2, wherein displaying the first snapshot includes displaying at least one of a date of creation of the first snapshot, a persistence of the snapshot, and a location of the snapshot.

4. The method of claim 1, further comprising:
    displaying the first snapshot to a user via a screen corresponding to the application that created the data of the primary volume.

5. The method as recited in claim 1, further comprising:
presenting a user one or more files created by the application that created the data of the primary volume; and
receiving a selection from the user to restore the file;
suspending access to the quick recovery volume;
restoring the selected file via the quick recovery volume; and
reinstating access to the quick recovery volume.

6. The method as recited in claim 1, further comprising:
taking a second snapshot of the primary volume of data, wherein the second snapshot only tracks changes to the primary volume of data after the first snapshot was taken; and
selecting the second snapshot as the source of data changed after the first snapshot was taken to copy to the quick recovery volume.

7. A method for periodically copying changing data on a primary volume, the method comprising:
performing a first snapshot of data in a primary volume, wherein the first snapshot tracks blocks of the primary volume;
associating application specific information to the first snapshot,
storing the first snapshot and the associated application specific information to a destination volume, wherein storing the first snapshot and the associated application specific information creates a copy of the primary volume that facilitates a logical connection between the first snapshot of the data and an application that created the data;
monitoring for a change in any one of the blocks tracked by the first snapshot;
performing a second snapshot of a particular block when the monitoring determines that there was a change in the particular block after the first snapshot was performed; and
storing the second snapshot to the destination volume.

8. The method of claim 7, further comprising:
producing a copy of the primary volume using the first snapshot and any copies of blocks that changed after the first snapshot, after at least one block has changed after the first snapshot was performed.

* * * * *

UNITED STATES PATENT AND TRADEMARK OFFICE
CERTIFICATE OF CORRECTION

PATENT NO. : 7,568,080 B2  
APPLICATION NO. : 10/681386  
DATED : July 28, 2009  
INVENTOR(S) : Prahlad et al.

Page 1 of 1

It is certified that error appears in the above-identified patent and that said Letters Patent is hereby corrected as shown below:

Title page, in field (60), under "Related U.S. Application Data", after "2002." insert -- Provisional application No. 60/416,699, filed on Oct. 7, 2002. --.

Title page 3, under "Other Publications", in column 2, line 7, after "2008," insert -- Examiner yoshimitsu Kudoh, --.

Title page 3, under "Other Publications", in column 2, line 9, after "2008," insert -- Examiner H. Wong, --.

Title page 3, under "Other Publications", in column 2, line 11, after "2008," insert -- Examiner Kanwal Pahwa, --.

Title page 3, under "Other Publications", in column 2, line 13, after "2008," insert -- Examiner J. Corrielus, --.

In column 5, line 26, delete "STORAGE." and insert -- STORAGE --, therefor.

In column 18, line 13, delete "90," and insert -- 906, --, therefor.

Signed and Sealed this

Twenty-second Day of September, 2009

David J. Kappos  
*Director of the United States Patent and Trademark Office*